(12) United States Patent
Oguro et al.

(10) Patent No.: US 8,830,781 B2
(45) Date of Patent: *Sep. 9, 2014

(54) STORAGE APPARATUS

(71) Applicant: Hitachi, Ltd., Tokyo (JP)

(72) Inventors: Ryohei Oguro, Hadano (JP); Yosuke Tsuyuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/132,489

(22) Filed: Dec. 18, 2013

(65) Prior Publication Data

US 2014/0181565 A1    Jun. 26, 2014

Related U.S. Application Data

(63) Continuation of application No. 13/391,096, filed as application No. PCT/JP2012/000561 on Jan. 30, 2012, now Pat. No. 8,635,471.

(51) Int. Cl.
*G11C 5/14* (2006.01)
*G06F 1/32* (2006.01)

(52) U.S. Cl.
CPC .................................. *G06F 1/3275* (2013.01)
USPC .......................................................... 365/226

(58) Field of Classification Search
USPC .......................................................... 365/226
See application file for complete search history.

(56) References Cited

U.S. PATENT DOCUMENTS

| 7,243,248 | B1* | 7/2007 | Roux et al. ................... 713/300 |
| 2005/0240814 | A1* | 10/2005 | Sasakura et al. ............... 714/14 |
| 2007/0260918 | A1* | 11/2007 | Okada et al. ................... 714/14 |
| 2009/0158070 | A1 | 6/2009 | Gruendler |
| 2011/0191601 | A1* | 8/2011 | Tsuyuki ....................... 713/300 |
| 2011/0219262 | A1* | 9/2011 | Maejima et al. ................ 714/14 |
| 2011/0231690 | A1* | 9/2011 | Honda .......................... 713/340 |

* cited by examiner

*Primary Examiner* — Hoai V Ho
*Assistant Examiner* — Pablo Huerta
(74) *Attorney, Agent, or Firm* — Volpe and Koenig, P.C.

(57) ABSTRACT

A storage apparatus writes data to a storage drive or reads data from a storage drive in response to an I/O request sent from a server. The storage apparatus includes a plurality of AC-DC power supplies supplying the storage drive with drive power is provided with a plurality of power supply paths provided for the respective AC-DC power supplies. A plurality of gate units are provided to the respective power supply paths and configured to stop supplying drive power to the storage drive through the corresponding power supply path when detecting voltage abnormality in the drive power supplied from the AC-DC power supply to the storage drive. The power supply paths allow each of the storage drives belonging to a same RAID group to receive the supply of the drive power from the AC-DC power supplies through different power supply paths, respectively.

10 Claims, 21 Drawing Sheets

ASSIGNMENT MANAGEMENT TABLE 1800

| RAID SYSTEM | RAID CONFIGURATION | POWER SUPPLY BOUNDARY ASSIGNMENT CONFIGURATION |
|---|---|---|
| RAID5 | 3D+1P | A+B+C+D |
|  | 7D+1P | A+B+C+D+E+F+G+H |
| RAID6 | 6D+2P | A+B+C+D+E+F+G+H |

Fig. 19

DRIVE MANAGEMENT TABLE 1900

| POWER SUPPLY BOUNDARY (1911) | DRIVE NUMBER (1912) | RAID ASSIGNMENT FLAG (1913) |
|---|---|---|
| A | 001 | ON |
|  | 002 | OFF |
|  | ... | ... |
| B | 101 | OFF |
|  | 102 | ON |
|  | ... | ... |
| ... | ... | ... |

Fig. 20

RAID MANAGEMENT TABLE 2000

| RAID-ID (2011) | DRIVE NUMBER (2012) | POWER SUPPLY CONFIGURATION (2013) |
|---|---|---|
| 1 | 001 | A |
|  | 102 | B |
|  | ... | ... |
| 2 | 003 | A |
|  | 105 | B |
|  | ... | ... |
| ... | ... | ... |

STORAGE APPARATUS

CROSS-REFERENCE TO RELATED APPLICATION

This application is a continuation of U.S. patent application Ser. No. 13/391,096 filed Feb. 17, 2012, which claims priority from PCT/JP2012/000561 filed Jan. 30, 2012, all of which are incorporated by reference as if fully set forth.

TECHNICAL FIELD

The present invention relates to a storage apparatus, and in particular, relates to a technique for safely supplying drive power to a storage drive by ensuring a redundancy of a power supply path of the drive power.

BACKGROUND ART

PTL 1 discloses a storage apparatus in which loads including a hard disk drive and the like are each connected with two AC/AD power supplies via a wired OR circuit and each directly receive power supply from each of the AC/AD power supplies.

CITATION LIST

Patent Literature

[PTL 1]
US Patent Application No. 2011/0191601 Specification

SUMMARY OF INVENTION

Technical Problem

A system in which two AC/AD power supplies directly supply power to each load via a wired OR circuit as disclosed in PTL 1 has a possibility of damaging a load when an AC/AD power supply breaks down and supplying excess voltage to the load, for example. In particular, if the damaged load is a hard disk drive configuring a RAID group, data restoration can be difficult.

The present invention has been made in view of such problem, and mainly aims at providing a storage apparatus capable of ensuring redundancy of power supply to a load and safely protecting the load even when a failure occurs in a power supply device.

Solution to Problem

An aspect of the present invention to achieve the above objective is a storage apparatus that writes data to a storage drive or reads data from the storage drive according to an I/O request sent from an outside unit, the storage apparatus comprising a plurality of power supply devices to supply the storage drive with drive power, a plurality of power supply paths provided for the respective power supply devices and each configured to supply drive power to the storage drive from the corresponding power supply device, and a plurality of gate units provided to each of the power supply paths and configured to stop supplying the drive power to the storage drive through the corresponding power supply path, when detecting an abnormal voltage in the drive power supplied from the power supply device to the storage drive.

Other problems disclosed in the present application and solutions thereto, will become apparent from the section of the description of embodiments and the drawings.

Advantageous Effects of Invention

According to the present invention, redundancy of power supply to a load can be ensured while safely protecting the load even when a failure occurs in a power supply device.

BRIEF DESCRIPTION OF DRAWINGS

FIG. 19 shows an example of a drive management table 1900.
FIG. 20 shows an example of a RAID management table 2000.

DESCRIPTION OF EMBODIMENTS

Figure 1:
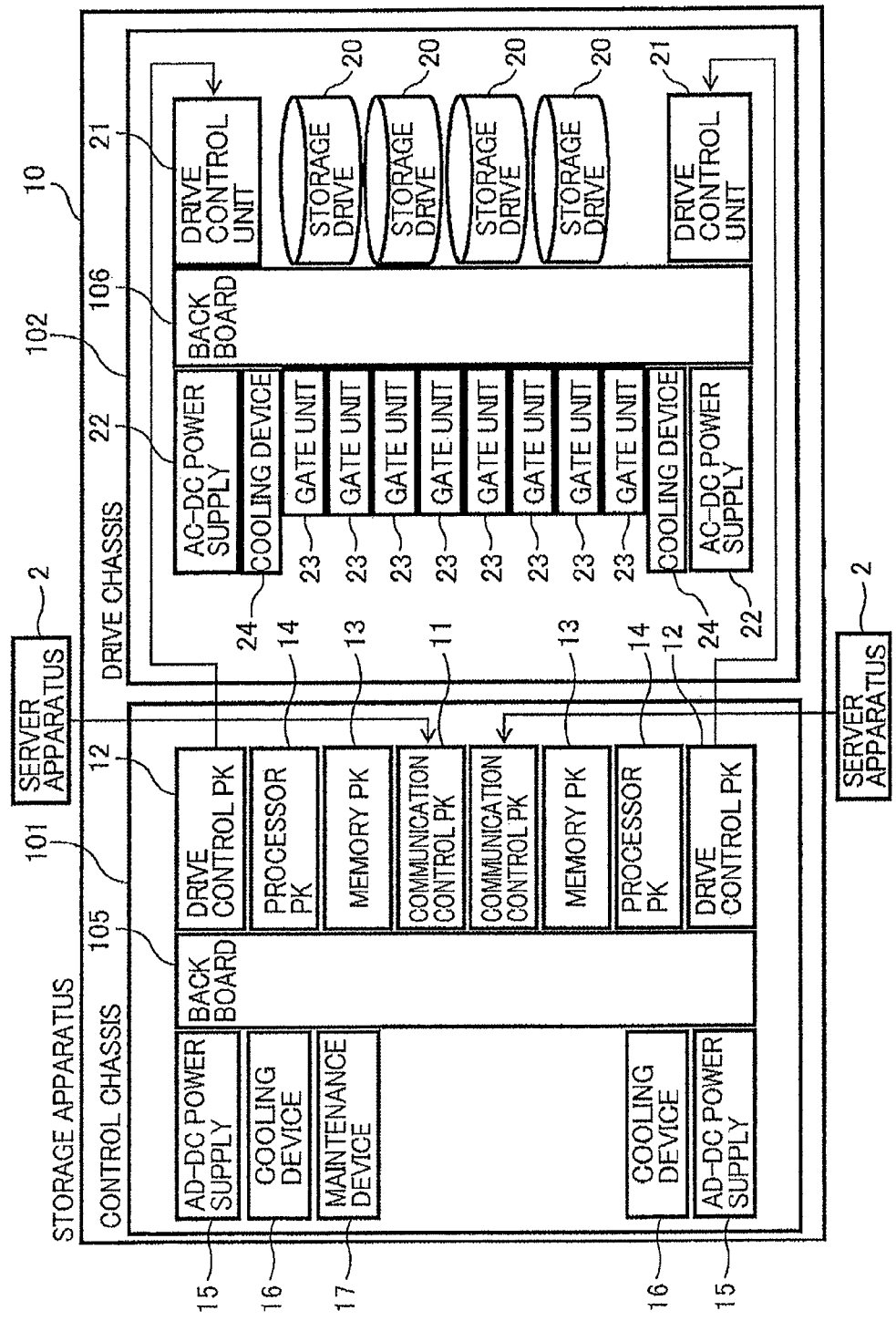
FIG. 1 is a drawing showing a schematic configuration of an information processing system 1.

Hereinafter, modes for carrying out the invention will described with reference to the drawings.
FIG. 1 shows a schematic configuration of an information processing system 1 described as an embodiment. The information processing system 1 is configured to include a storage apparatus 10 (a disk array apparatus) and server apparatuses 2. The storage apparatus 10 and the server apparatuses 2 are communicatively coupled to each other via communication means. The communication means is, for example, the Internet, a wide area network, a public telecommunication network, a lease line, LAN (Local Area Network), WAN (Wide Area Network), or the like.

The storage apparatus 10 is installed in, for example, a system center or data center of a company. For example, the storage apparatus 10 provides services, such as a cloud service, an online system service of a bank, and an information processing service in an organization such as a company.

The server apparatus 2 is an information apparatus such as a personal computer, an office computer, an automated teller machine (CD, ATM), or a mainframe, for example.

The server apparatus 2 sends a data frame containing a data I/O request (a data write request, a data read request and the like) to the storage apparatus 10 when accessing storage area provided by the storage apparatus 10. The data frame is, for example, a FC frame (FC: Fibre Channel) of a fibre channel. The storage apparatus 10 accesses the storage medium in response to the data I/O request received from the server apparatus 2 and then returns a reply in the form of data or processing to the server apparatus 2.

As shown in FIG. 1, the storage apparatus 10 includes a control chassis 101 and one or more drive chassis 102.

Mounted on the control chassis 101 are communication control PKs 11, drive control PKs 12, memory PKs 13, processor PKs 14, AC-DC power supplies 15, cooling devices 16, a maintenance device 17, and the like. These components are mounted on a back board 105 installed inside the control chassis 101. In addition, particular kinds of components among these components (e.g., the communication control PK 11, the drive control PK 12, the memory PK 13, the processor PK 14, the AC-DC power supply 15, and the cooling device 16) are redundantly mounted on the control chassis 101 with view to improve the fault tolerance and reliability of the storage apparatus 10 and improving the performance thereof.

Among the components mounted on the control chassis 101, the communication control PK 11 includes a circuit (a central processing unit, a memory, a communication interface, or the like) for implementing communication between the communication control PK 11 and the server apparatus 2 which is performed through communication means. For example, as typical functions of the communication control PK 11 there are control relating to a communication protocol, reception of a data I/O request (a data write request, a data read request) sent from the server apparatus 2, and transmission to the server apparatus 2 of a response of processing with respect to the received data I/O request (e.g., read data, a read completion report, a write completion report).

Figure 2:
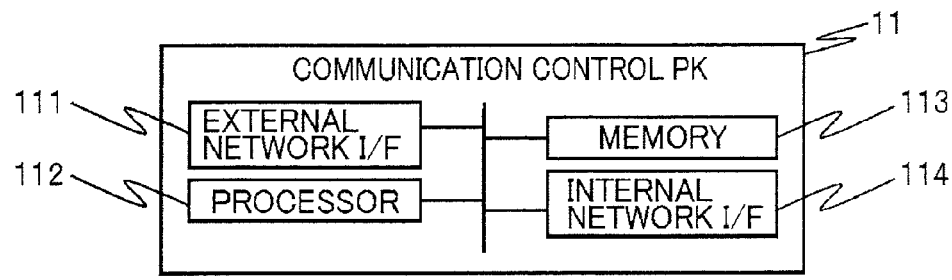
FIG. 2 is a drawing showing a configuration of a communication control PK 11.

FIG. 2 shows a configuration of the communication control PK 11. As shown in FIG. 2, the communication control PK 11 includes an external network I/F 111 (I/F: Interface) to communicate with the server apparatus 2, a processor 112, a memory 113, an internal network I/F 114 to communicate with other components (such as the drive control PK 12, the memory PK 13, the processor PK 14), and the like.

The drive control PK 12 among the components mounted on the control chassis 101 includes a circuit (such as a central processing unit, a memory, or a communication interface) to achieve communication with the disk chassis 102. Typical functions of the drive control PK 12 include read and transfer of data stored in the storage drive 20 to the memory PK 13 and transfer of data stored in the memory PK 13 to the storage drive 20.

Figure 3:
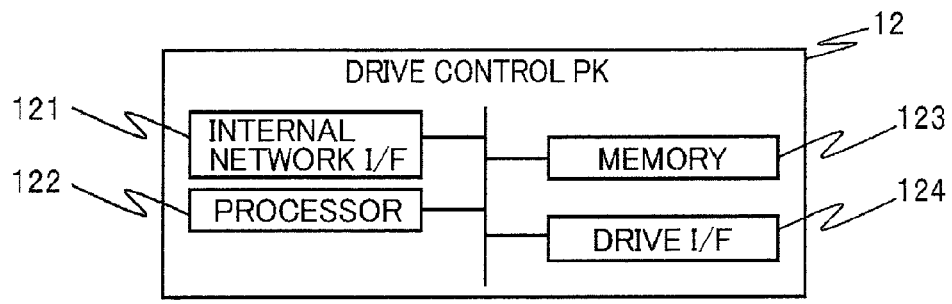
FIG. 3 is a drawing illustrating a configuration of a drive control PK 12.

FIG. 3 shows a configuration of the drive control PK 12. As shown in FIG. 3, the drive control PK 12 includes an internal network I/F 121 to communicate with other components (such as the communication control PK 11, the memory PK 13, and the processor 14), a processor 122, a memory 123, and a drive I/F 124.

The memory PK 13 among the components mounted on the control chassis 101 includes a memory element such as a RAM, ROM, or NVRAM. The memory element is used as, for example, a cache memory for temporarily retaining data to be written to the storage drive 20 or data read from the storage drive 20 and sent to the server apparatus 2. Also, the memory element is used as a location for storing a program or data to be utilized by the communication control PK 11, the drive control PK 12, and the processor PK 14.

The processor PK 14 among the components mounted on the control chassis 101 includes a circuit (such as a central processing unit, DMA (Direct Memory Access), a memory, or a communication interface) to mediate data transfer to be performed among the communication control PK 11, the drive control PK 12, and the memory PK 13. Typical functions of the processor PK 14 include delivery of data (data read from the storage drive 20, data to be written to the storage drive 20) via the memory PK 13 between the communication control PK 11 and the drive control PK 12, staging (read of data from the storage drive 20) or destaging (write of data to the storage drive 20) of data stored in the memory PK 13.

Figure 4:
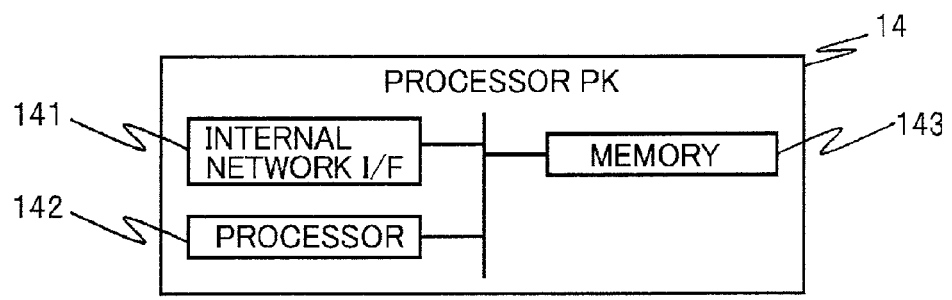
FIG. 4 is a drawing illustrating a configuration of a processor PK 14.

FIG. 4 shows a configuration of the processor PK 14. As shown in FIG. 4, the processor PK 14 includes an internal network I/F 141 to communicate with other components (such as the communication control PK 11, the drive control PK 12, and the memory PK 13), a processor 142, a memory 143, and the like.

The AC-DC power supply 15 among the components mounted on the control chassis 101 supplies drive power to the other components mounted on the control chassis 101. For example, the AC-DC power supply 15 converts voltage supplied from a commercial power system (e.g., AC 200V) into a rated voltage of a destination to which the drive power is supplied (e.g., DC 12V).

The cooling device 16 among the components mounted on the control chassis 101 is configured of, for example, a cooling fan, a cooling mechanism, a semiconductor cooling element (such as a Peltier device), and the like. For example, the cooling device 16 suppresses increase in temperature inside the control chassis 101 by absorbing heat generated from each component mounted on the control chassis 101 or discharging heat outside the control chassis 101.

The maintenance device 17 among the components mounted on the control chassis 101 performs setting, control, state monitoring of the components included in the storage apparatus 10.

The maintenance device 17 is an information apparatus (such as a personal computer), and includes a central processing unit (such as a CPU or MPU), a memory (such as a RAM, ROM, or NVRAM), a secondary storage (also referred to as a hard disk drive or semiconductor storage device (SSD (Solid State Drive))), an input device (such as a keyboard, mouse, or touch panel), a display (such as a liquid crystal monitor, or organic EL panel), a communication device (such as an NIC), and the like.

The maintenance device 17 communicates with the components included in the storage apparatus 10 via communication means such as a LAN as needed and performs acquisition of information (such as configuration information, various pieces of setting information, or operating information) from the storage apparatus 10 and setting, control, and maintenance of the storage apparatus 10.

The maintenance device 17 may be communicatively coupled with an information apparatus (hereinafter referred to as a management apparatus) provided outside the storage apparatus 10 via a communication means such as a LAN. The management apparatus provides an interface (such as a GUI (Graphical User Interface), or CLI (Command Line Interface)) for a user or an operator to perform setting, control, and maintenance of the storage apparatus 10 (including installation or update of software).

As shown in FIG. 1, a plurality of storage drives 20, drive control units 21, AC-DC power supplies 22, gate units 23, and cooling devices 24 are mounted on the drive chassis 102. These components are mounted on a back board 106 installed inside the drive chassis 102, for example. These components are redundantly mounted on the drive chassis 102 with an objective to improve the fault tolerance and reliability.

The storage drive 20 is, for example, a hard disk drive (Hard Disk Drive) (a hard disk drive, such as an SAS (Serial Attached SCSI), SATA (Serial ATA), FC (Fibre Channel), PATA (Parallel ATA), or SCSI (Small Computer System Interface), or a semiconductor storage device (SSD).

The storage apparatus 10 provides places for data storage to the server apparatus 2 using a logical data storage area, in units, which is provided by controlling the storage drives 20 in RAID (Redundant Arrays of Inexpensive (or Independent) Disks) systems (RAID 0 to 6). This logical data storage area is provided as a data storage area of, for example, a RAID group 51 (also referred to as a Parity Group). Note that it is assumed that in the storage apparatus 10 of the present embodiment, at least one or more RAID groups 51 of the RAID 5 system are configured of a plurality of storage drives 20.

The drive control unit 21 among the components mounted on the drive chassis 102 communicates with the drive control PK 12 on the control chassis 101 side as needed and performs transfer of data stored in the storage drive 20 to the memory PK 13 or transfer of data stored in the memory PK 13 to the storage drive 20 in cooperation with the drive control PK 12.

The AC-DC power supply 22 among the components mounted on the drive chassis 102 supplies drive power to each component on the drive chassis 102. The AC-DC power supply 22 includes one or more AC-DC converters 221 and converts a predetermined voltage (e.g., AC 200V) supplied from a commercial power system into a rated voltage (e.g., DC 12V) of a destination to which the drive power is supplied.

The gate unit 23 performs detection of abnormality in output voltage (e.g., an excess voltage) outputted from the AC-DC power supply 22, conversion to a direct current voltage, a hot swap, current back-flow prevention (current back-flow prevention to the AC-DC power supply 22), and the like. The circuit and functions of the gate unit 23 are described later in detail.

The gate unit 23 is accommodated in a chassis different from the chassis (e.g., an electromagnetic shielded case) in which the AC-DC power supply 22 is accommodated. With this configuration, damage of the gate unit 23 by failure of the AC-DC power supply 22 can be prevented.

The cooling device 24 is configured using, for example, a cooling fan, a cooling device, or a semiconductor cooling element (such as a Peltier element). For example, the cooling device 24 prevents increase in temperature inside the drive chassis 102 by absorbing heat generated from each component mounted on the drive chassis 102 or discharging the heat outside the drive chassis 102.

When accepting an I/O request (a data write request, a data read request) from the server apparatus 2, the storage apparatus 10 operates, for example, as follows.

For example, in a case where a data write request is received from the server apparatus 2, the communication control PK 11 firstly notifies the processor PK 14 to that effect. The processor PK 14 which has received the notification creates a drive write request based on the data write request and sends it to the drive control PK 12, and then stores the write data in the memory PK 13.

The communication control PK 11 sends a completion report to the server apparatus 2 when the processor PK 14 stores the write data in the memory PK 13. When receiving the drive write request from the processor PK 14, the drive control PK 12 registers the received drive write request in a write processing queue. The drive control PK 12 reads the drive write request from the write processing queue as needed, reads the write data designated by the read drive write request from the memory PK 13, and then writes this in the storage drive 20.

Also, for example, in a case where a data read request is received from the server apparatus 2, the communication control PK 11 firstly notifies the drive control PK 12 to that effect. The drive control PK 12 which has received the notification reads data designated by the data read request (e.g., designated by a LBA (Logical Block Address)) from the storage drive 20. Note that when the read data has been already read into the memory PK 13, reading of data from the storage drive 20 can be omitted.

The processor PK 14 reads the data read by the drive control PK 12 from the memory PK 13, and transfers the read data to the communication control PK 11. When receiving the read data sent from the processor 14, the communication control PK 11 sends the read data to the server apparatus 2.

Figure 5:
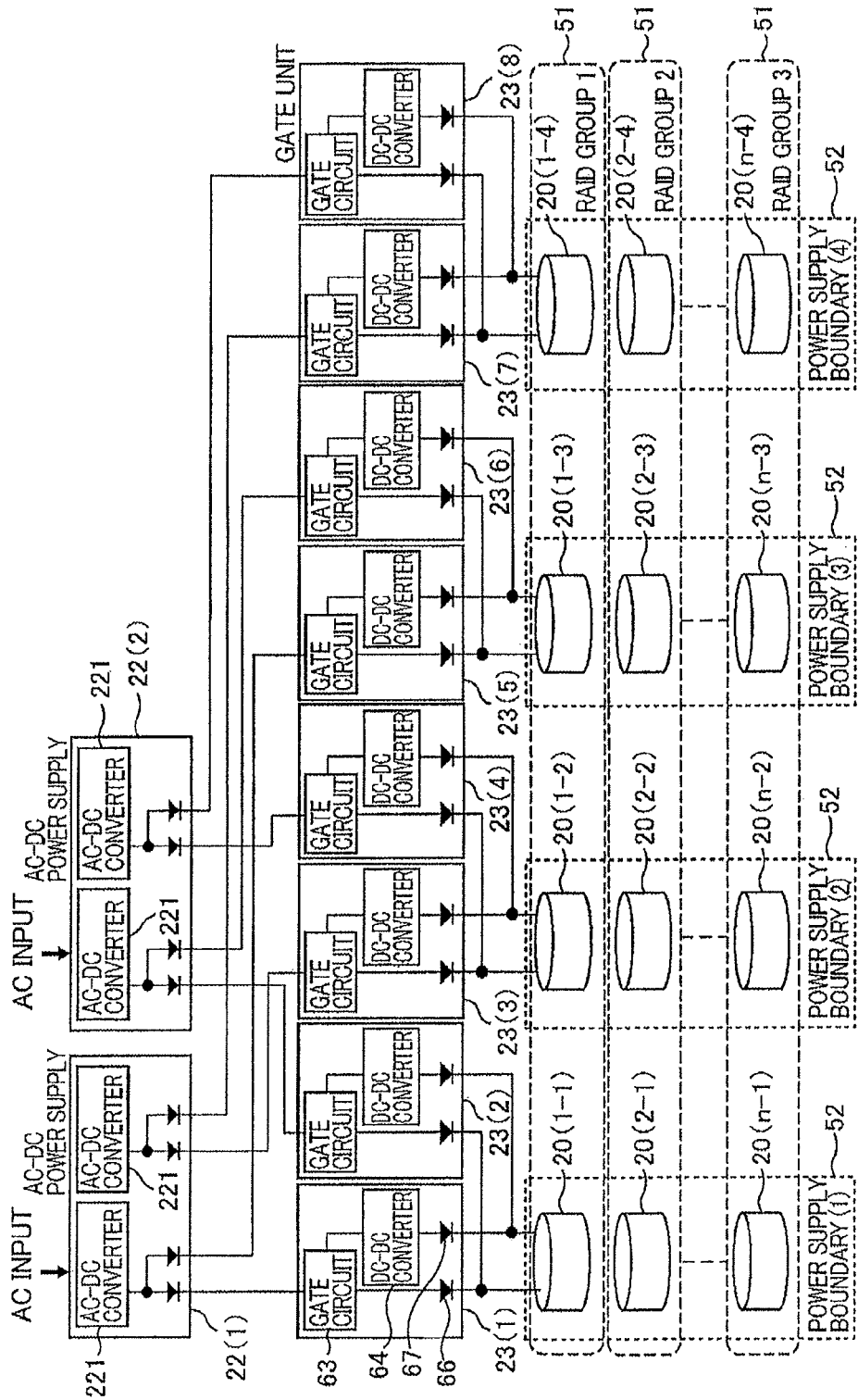
FIG. 5 is a drawing illustrating a supply mode of drive power to a storage drive 20.

FIG. 5 is a drawing illustrating a mode of supplying drive power from the two AC-DC power supplies 22(1), (2) mounted on the drive chassis 102 to the storage drives 20 mounted on the same chassis 102.

As shown in FIG. 5, the drive chassis 102 is provided with a plurality of power supply paths for supplying drive power from each of the two AC-DC power supplies 22(1), (2) to the storage drives 20. Also, each of the power supply paths is provided with a gate unit 23 to stop supplying the drive power to the storage drive 20 through the power supply path when detecting an abnormal voltage in the drive power supplied from the AC-DC power supply 22 to the storage drive 20. In this manner, drive power is redundantly supplied to each of the storage drives 20 from the AC-DC power supplies 22(1), (2) through the independently-provided power supply paths.

Specifically, for example, the storage drive 20(1-1) is supplied with drive power supplied from the AC-DC power supply 22(1) via the gate unit 23 and drive power supplied from the AC-DC power supply 22(2) via another gate unit 23(2) as well.

Also, for example, the storage drive 20(1-2) is supplied with drive power from the AC-DC power supply 22(1) via the gate unit 23(3) and drive power from the AC-DC power supply 22(2) via another gate unit 23(4) as well.

Note that as shown in FIG. 5, although those incorporating two converters and creating four output systems are used as the AC-DC power supply 22(1), (2), the configuration of the AC-DC power supply 22 is not necessarily limited to the one shown in the drawing.

In the storage apparatus 10 illustrated in FIG. 5, the storage drives 20 configure a RAID group 51 of the RAID 5 system (hereinafter denoted as RAID 5 (3D+1P) or the like) in which three storage drives 20 are used as data drives and one storage drive 20 is used as a parity drive.

For example, the storage drive 20(1-1), the storage drive 20(1-2), the storage drive 20(1-3), and the storage drive 20(1-4) configure a RAID group 51, called "RAID group 1".

Also, the storage drive 20(2-1), the storage drive 20(2-2), the storage drive 20(2-3), and the storage drive 20(2-4) configure a RAID group 51, called "RAID group 2".

As shown in the drawing here, storage drives 22 configuring the same RAID group 51 are each supplied with drive power from the AC-DC power supplies 22 through different power supply paths.

In other words, a storage drive 20 (m-1) among the four storage drives 20 (m-1), (m-2), (m-3), (m-4) configuring the RAID group 51 called "RAID group m" (m=1, 2, . . . , n) is supplied with drive power from the AC-DC power supply 22(1) via the gate unit 23(1) and is supplied with drive power from the AC-DC power supply 22(2) via the gate unit 23(2) as well.

Similarly, the storage drive 20(m-2) is supplied with drive power from the AC-DC power supply 22(1) via the gate unit 23(3) and is supplied with drive power from the AC-DC power supply 22(2) via the gate unit 23(4) as well.

Likewise, the storage drive 20 (m-3) is supplied with drive power from the AC-DC power supply 22(1) via the gate unit 23(5) and is supplied with drive power from the AC-DC power supply 22(2) via the gate unit 23(6) as well.

Likewise, the storage drive 20 (m-4) is supplied with drive power from the AC-DC power supply 22(1) via the gate unit 23(7) and is supplied with drive power from the AC-DC power supply 22(2) via the gate unit 23(8) as well.

Note that in the following description, a group that is configured of a group of storage drives 20 to which drive power is supplied through a common power supply path is referred to as a power supply boundary 52. In other words, in the case of the storage apparatus 10 shown in FIG. 5, the power supply boundary 52(1) is configured of the storage drive 20(1-1), the storage drive 20(2-1), . . . , and the storage drive 20(n-1). Similarly, the power supply boundary 52(2) is configured of the storage drive 20(1-2), the storage drive 20(2-2), . . . , and the storage drive 20(n-2). Likewise, the power supply boundary 52(3) is configured of the storage drive 20(1-3), the storage drive 20(2-3), . . . , and the storage drive 20(n-3). Likewise, the power supply boundary 52(4) is configured of the storage drive 20(1-4), the storage drive 20(2-4), . . . , and the storage drive 20(n-4).

Figure 6:
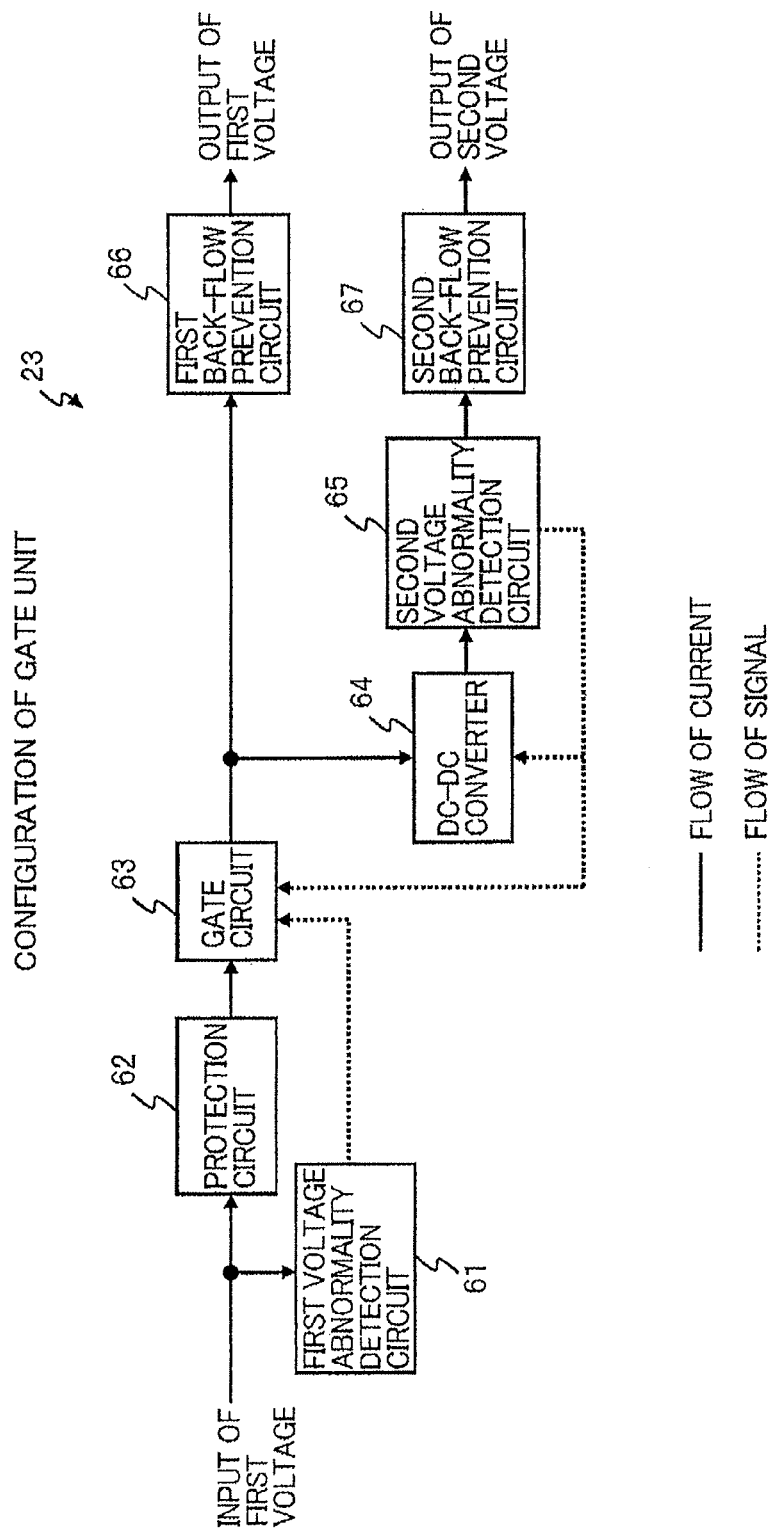
FIG. 6 is a drawing illustrating a configuration of a gate unit 23.

FIG. 6 shows a configuration (a block diagram) of the gate unit 23. The gate unit 23 includes a first voltage abnormality detection circuit 61, a protection circuit 62, a gate circuit 63, a DC-DC converter 64 (a voltage conversion circuit), a second voltage abnormality detection circuit 65, a first back-flow prevention circuit 66, and a second back-flow prevention circuit 67. Note that in the drawing, the solid line denotes the flow of a current and the dotted line denotes the flow of a signal.

The first voltage abnormality detection circuit 61 monitors the voltage supplied from the AC-DC power supply 22 (e.g., a voltage of DC 12V). When detecting abnormality of voltage supplied from the AC-DC power supply 22, the first voltage abnormality detection circuit 61 inputs a signal indicating to that effect (hereinafter referred to as a first voltage abnormality detection signal) to the gate circuit 63. Note that in the present embodiment, as an example where voltage supplied from the AC-DC power supply 22 is abnormal, description is given of a case where a voltage supplied from the AC-DC power supply 22 becomes an excess voltage (a case where a voltage supplied from the AC-DC power supply 22 exceeds a first reference voltage).

While normal voltage is supplied from the AC-DC power supply 22, the gate circuit 63 supplies a first voltage based on the normal voltage to the DC-DC converter 64 and the first back-flow prevention circuit 66. On the other hand, when the voltage supplied from the AC-DC power supply 22 becomes abnormal and a first voltage abnormality detection signal is inputted from the first voltage abnormality detection circuit 61, the gate circuit 63 stops supplying the first voltage to the DC-DC converter 64 and the first back-flow prevention circuit 66.

The gate circuit 63 has functions of limiting a rush current generated when the gate unit 23 is hot-swapped to the backboard 105 of the control chassis 101 and suppressing effect (such as voltage drop) on the AC-DC power supply 22 when the gate circuit 63 is hot-swapped. The protection circuit 62 on the previous stage of the gate circuit 63 is provided with an objective to prevent excess voltage from being applied to the gate circuit 63.

The DC-DC converter 64 supplies a second voltage which is a voltage converted from the first voltage supplied from the gate circuit 63 (e.g., a voltage of DC 5V) to a circuit in the subsequent stage when a normal first voltage is supplied from the gate circuit 63. On the other hand, the DC-DC converter 64 stops supplying the second voltage to the circuit in the subsequent stage when a second voltage abnormality detection signal is inputted from the second voltage abnormality detection circuit 65.

The second voltage abnormality detection circuit 65 monitors the second voltage supplied from the DC-DC converter 64. When abnormality is found in the second voltage, the second voltage abnormality detection circuit 65 inputs a signal (hereinafter referred to as a second voltage abnormality detection signal) indicating to that effect to the gate circuit 63. Note that in the present embodiment, as an example of a case where the second voltage supplied from the DC-DC converter 64 is abnormal, description is given of a case where the second voltage becomes excess voltage (a case where the second voltage exceeds the second reference voltage).

When the supply of the first voltage from the gate circuit 63 is stopped, the first back-flow prevention circuit 66 cuts off the flow path of a current to the circuit in the subsequent stage to prevent a back-flow of the current from a load side when a reverse potential (such as a potential increase on a load side) occurs.

When the supply of the second voltage from the DC-DC converter 65 is stopped, the second back-flow prevention circuit 67 cuts off the flow path of a current to the circuit in the subsequent stage to prevent a back-flow of the current from the load side when a reverse potential (such as a potential increase on a load side) occurs.

Figure 7:
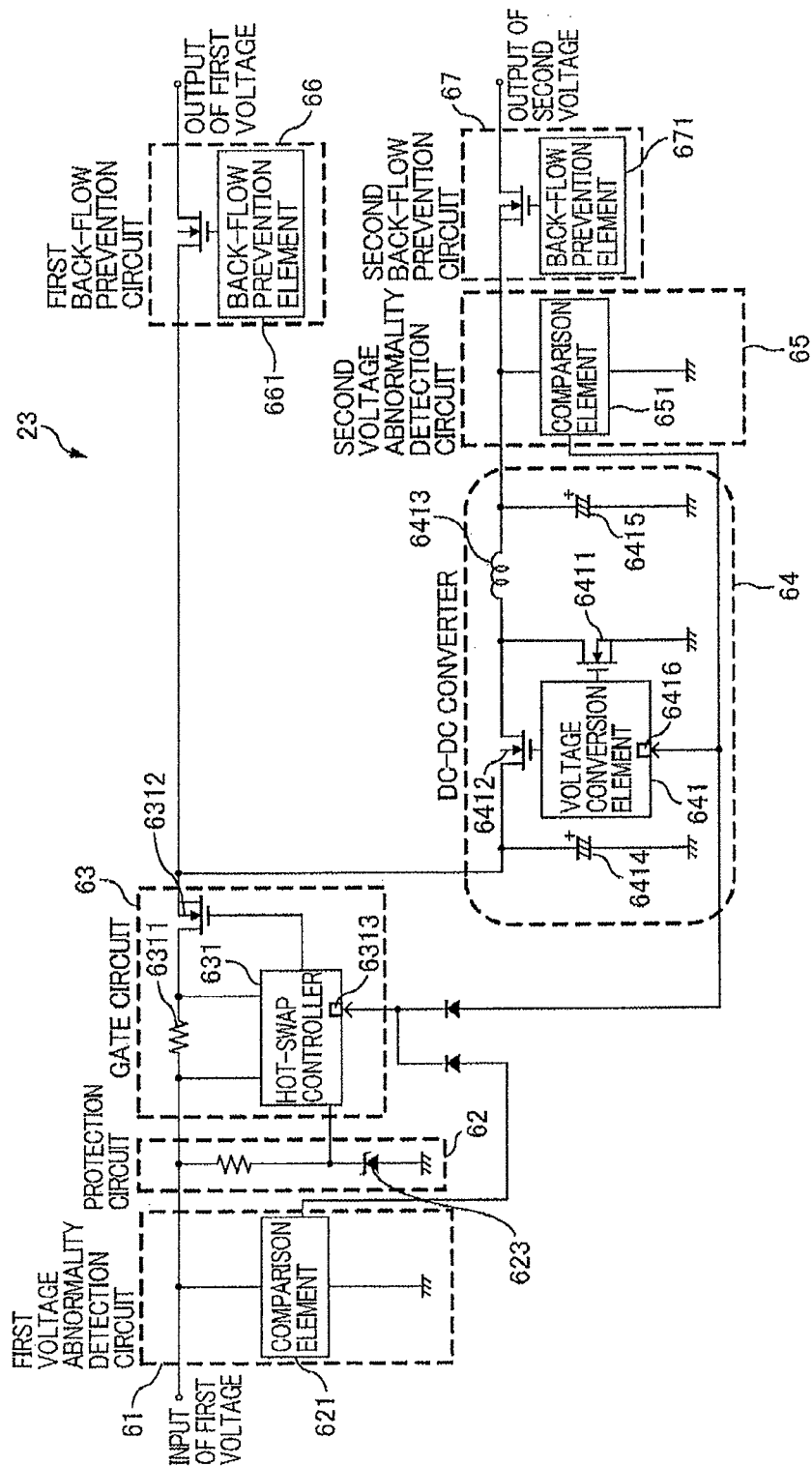
FIG. 7 is an example of a circuit of the gate unit 23.

FIG. 7 illustrates an example of a specific circuit configuration to implement the gate unit 23 provided with the above-described configuration.

As shown in FIG. 7, the first voltage abnormality detection circuit 61 can be configured using, for example, a comparison element 621 of an operational amplifier (comparator) to compare the first voltage with the first reference voltage.

The gate circuit 63 can be configured using, for example, a semiconductor integrated circuit (IC: Integrated Circuit) (hereinafter referred to as a hot-swap controller 631) having a function to suppress an abnormal current (such as a rush current) generated when the gate unit 23 is hot-swapped to the backboard 105.

Based on the current value detected by the sense circuit 6311, the hot-swap controller 631 controls a transistor 6312 (e.g., a field-effect transistor (MOSFET)) which is externally coupled to the hot-swap controller 631 to limit an abnormal current generated at the time of the hot-swap of the gate unit 23.

The hot-swap controller 631 includes an input terminal 6313 for a control signal, and controls the transistor 6312 (for example, an ON/OFF control) to stop supplying the first voltage to the DC-DC converter 64 and the first back-flow prevention circuit 66 when a first voltage abnormality detection signal is inputted from the first voltage abnormality detection circuit 61 or a second voltage abnormality detection signal is inputted from the second voltage abnormality detection circuit 65.

Note that the gate circuit 63 functions as a fuse to prevent excess voltage from flowing through the gate unit 23. In other words, the gate circuit 63 turns off the transistor 6312 to stop supplying the first voltage to the circuit in the subsequent stage when detecting that an excess voltage has flown through the sense circuit 6311.

As described above, the gate circuit 63 having the above-described function can be easily implemented utilizing the existing hot-swap controller 631.

The protection circuit 62 can be achieved by, for example, a clamp circuit using a constant voltage element 623 such as a zener diode.

The DC-DC converter can be implemented using, for example, a switching voltage transformer element 623 (e.g., an element to control ON/OFF of externally-coupled transistors 6411, 6412 and perform voltage transformation utilizing electromagnetic induction of an externally-coupled choke coil 6413 and charge and discharge of capacitors 6414, 6415).

Note that, as the voltage transformer element 641, that including an input terminal 6416 for control signals is used. The voltage transformer element 641 stops supplying the second voltage to the circuit in the subsequent stage when a second voltage abnormality detection signal is inputted from the second voltage abnormality detection circuit 65.

The second voltage abnormality detection circuit 65 can be implemented using a comparison element 651 such as an operation amplifier (a comparator) to compare the second voltage with a reference voltage. The second voltage abnormality detection circuit 65 shown in FIG. 7 inputs a second voltage abnormality detection signal to the gate circuit 63 and the DC-DC converter 64 when the second voltage exceeds the reference voltage.

The first back-flow prevention circuit 66 can be implemented using, for example, a back-flow prevention element 661 such as a diode or ideal diode controller. The first back-flow prevention circuit 66 cuts off the flow path of the current to the circuit in the subsequent stage when the supply of the first voltage from the gate circuit 63 is stopped, for example. Note that when an ideal diode controller is used as the back-flow prevention element 661, the back-flow of the current can be effectively prevented while suppressing power loss.

The second back-flow prevention circuit 67 can be achieved using, for example, a back-flow prevention element 671, such as a diode or an ideal diode controller. The second back-flow prevention circuit 67 cuts off the flow path of the current to the subsequent stage when the supply of the second voltage from the DC-DC converter 64 is stopped, for example. Note that when an ideal diode controller is used as the back-flow prevention element 671, the back-flow of the current can be effectively prevented while suppressing power loss.

Figure 8:
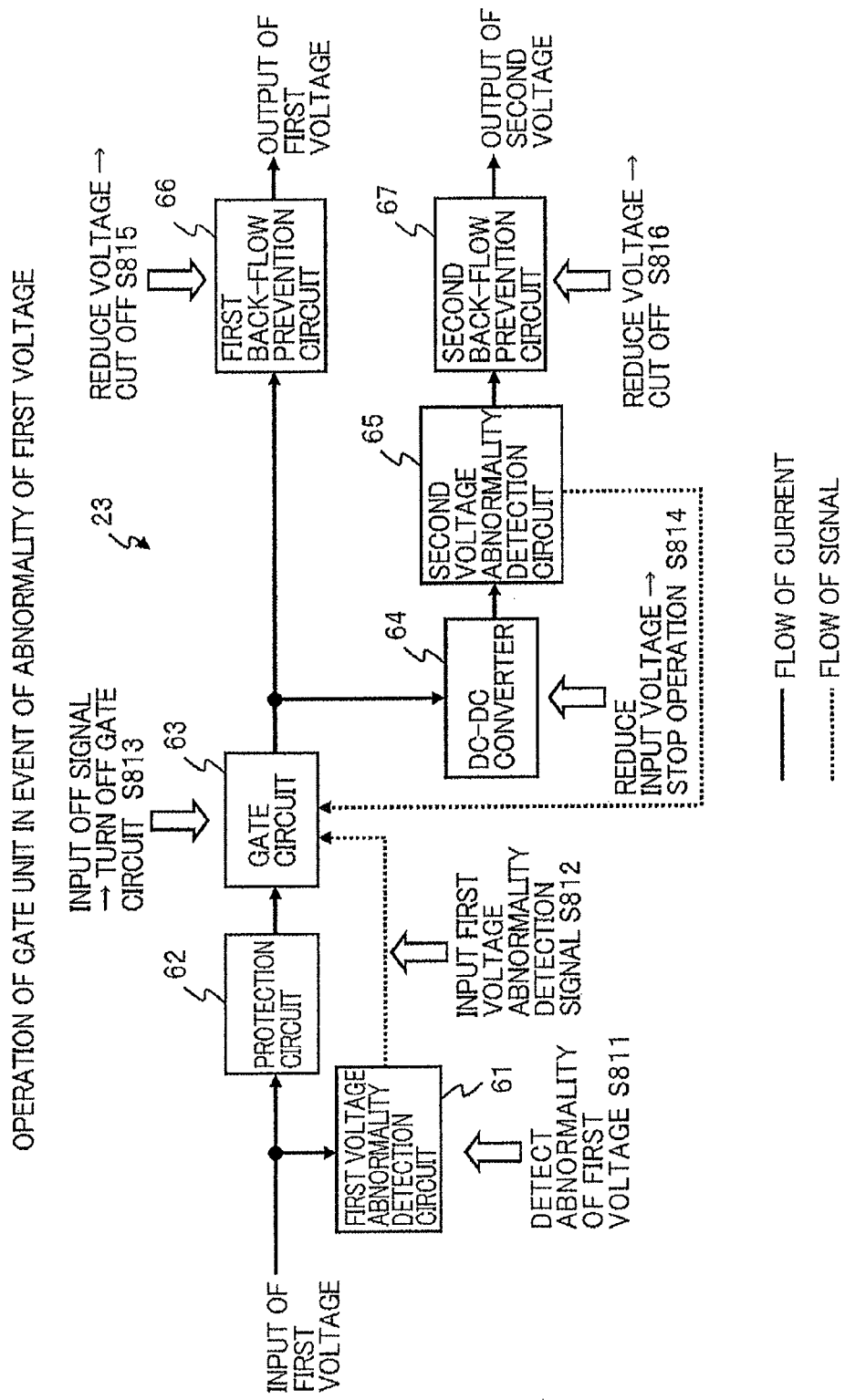
FIG. 8 is a drawing illustrating an operation of the gate unit 23 in a case an abnormality occurs in the first voltage.

Next, specific operations of the gate unit 23 will be described. FIG. 8 is a drawing illustrating an operation of the gate unit 23 in a case an abnormality has occurred in the first voltage supplied from the AC-DC power supply 22.

When detecting an abnormality in the first voltage supplied from the AC-DC power supply 22 (S811), the first voltage abnormality detection circuit 61 inputs a first voltage abnormality detection signal to the gate circuit 63 (S812).

When the first voltage abnormality detection signal is input, the gate circuit 63 stops supplying the first voltage to the DC-DC converter 64 and the first back-flow prevention circuit 66 (S813).

When the supply of the first voltage from the gate circuit 63 is stopped (S813), the DC-DC converter 64 stops supplying the second voltage (S814).

When the supply of the first voltage from the gate circuit 63 is stopped (S813), the first back-flow prevention circuit 66 cuts off an inflow of the current from the circuit in the subsequent stage (S815). Also, when the supply of the second voltage from the DC-DC converter 64 is stopped (S814), the second back-flow prevention circuit 67 cuts off an inflow of the current from the circuit in the subsequent stage (S816).

As described above, when an abnormality occurs in the first voltage supplied from the AC-DC power supply 22, the supply of the first voltage and second voltage from the gate unit 23 to the circuit in the subsequent stage is immediately stopped. For this reason, an excess voltage can be certainly prevented from being applied to the storage drive 20 when an abnormality occurs in the first voltage supplied from the AC-DC power supply 22.

Also, when the supply of the first voltage and second voltage from the gate unit 23 to the circuit in the subsequent stage is stopped, the first back-flow prevention circuit 66 and second back-flow prevention circuit 67 immediately operate to cut off the back-flow of the current, whereby the back-flow of the current from the storage drive 20 side to the gate unit 23 can be certainly prevented. Therefore, the gate unit 23 is prevented from being damaged due to abnormality of the first voltage supplied from the AC-DC power supply 22.

Figure 9:
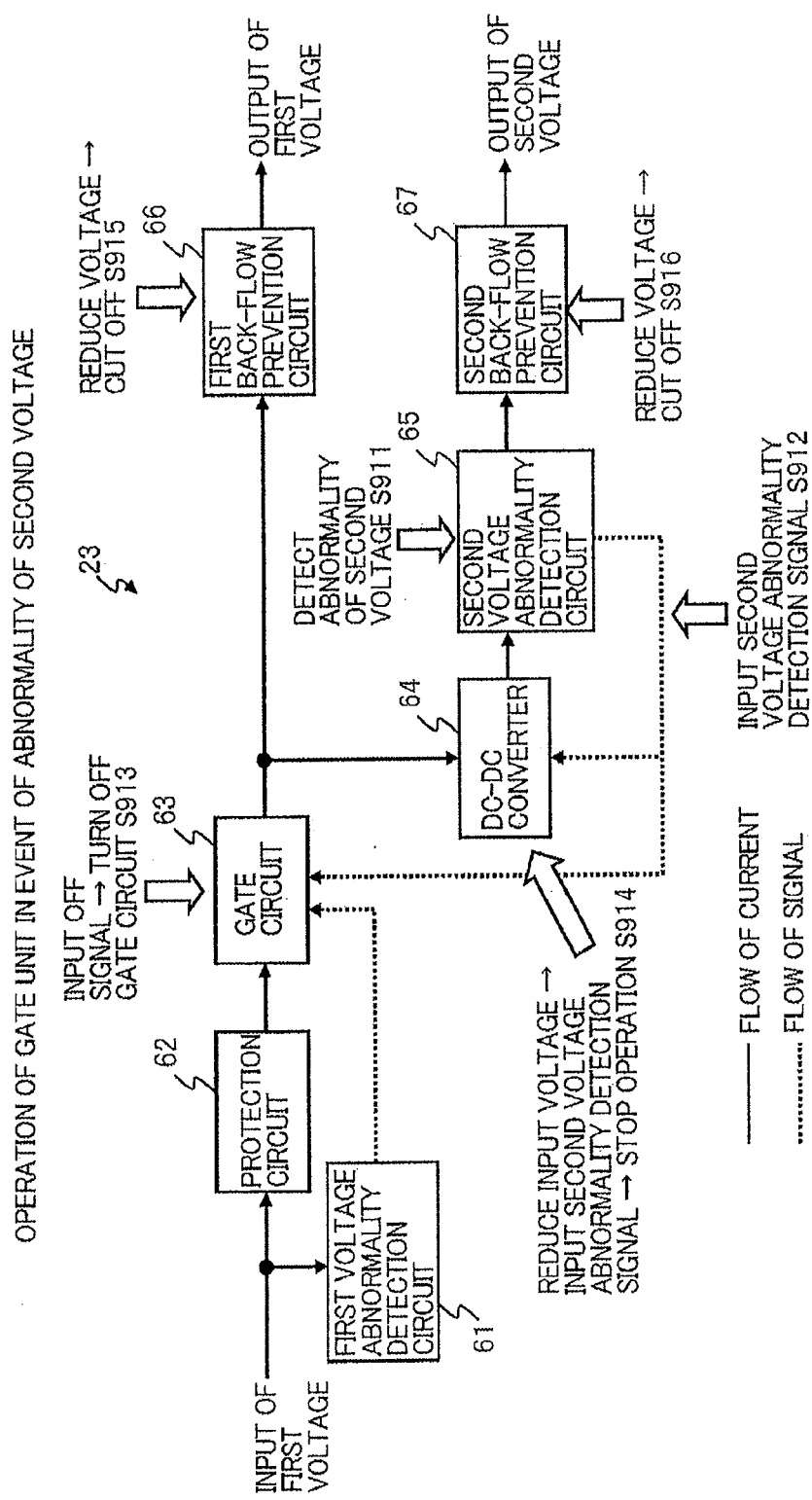
FIG. 9 is a drawing illustrating an operation of the gate unit 23 in a case an abnormality occurs in the second voltage.

FIG. 9 is a drawing illustrating an operation of the gate unit 23 in a case an abnormality occurs in the second voltage outputted from the DC-DC converter 64.

When an abnormality in the second voltage is detected (S911), the second voltage abnormality detection circuit 65 inputs a second voltage abnormality detection signal to the DC-DC converter 64 and the gate circuit 63 (S912).

When the second voltage abnormality detection signal is input, the gate circuit 63 stops supplying the first voltage to the DC-DC converter 64 and the first back-flow prevention circuit 66 (S913).

The DC-DC converter 64, in response to an input of the second voltage abnormality detection signal from the second voltage abnormality detection circuit 65 (S912) or the stop of supply of the first voltage from the gate circuit 63 (S913), stops supplying the second voltage (S914).

When the supply of the first voltage from the gate circuit 63 is stopped (S913), the first back-flow prevention circuit 66 cuts off an inflow of the current from the circuit in the subsequent stage (S915). Also, when the supply of the second voltage from the DC-DC converter 64 is stopped (S914), the second back-flow prevention circuit 67 cuts off an inflow of the current from the circuit in the subsequent circuit (S916).

As described above, when an abnormality occurs in the second voltage supplied from the DC-DC converter 64, supply of the first voltage from the gate circuit 63 to the DC-DC converter 64 and the first back-flow prevention circuit 66 is immediately stopped, and supply of the first voltage and second voltage from the DC-DC converter 64 to the circuit in the subsequent stage is stopped. For this reason, an excess voltage can be certainly prevented from being applied to the storage drive 20 when an abnormality occurs in the second voltage outputted from the DC-DC converter 64.

Also, when the supply of the first voltage and second voltage from the gate unit 23 to the circuit in the subsequent stage is stopped, the first back-flow prevention circuit 66 and the second back-flow prevention circuit 67 immediately operate to cut off the back-flow of the current, whereby the back-flow of the current from the storage drive 20 side to the gate unit 23 can be certainly prevented. For this reason, it can be prevented that the gate unit 23 is damaged by the abnormality in the second voltage outputted from the DC-DC converter 64.

Next, description will be given of operations of each component on the drive chassis 102 when a failure occurs in the storage apparatus 10, and will be given for each kind of failure.

Figure 10:
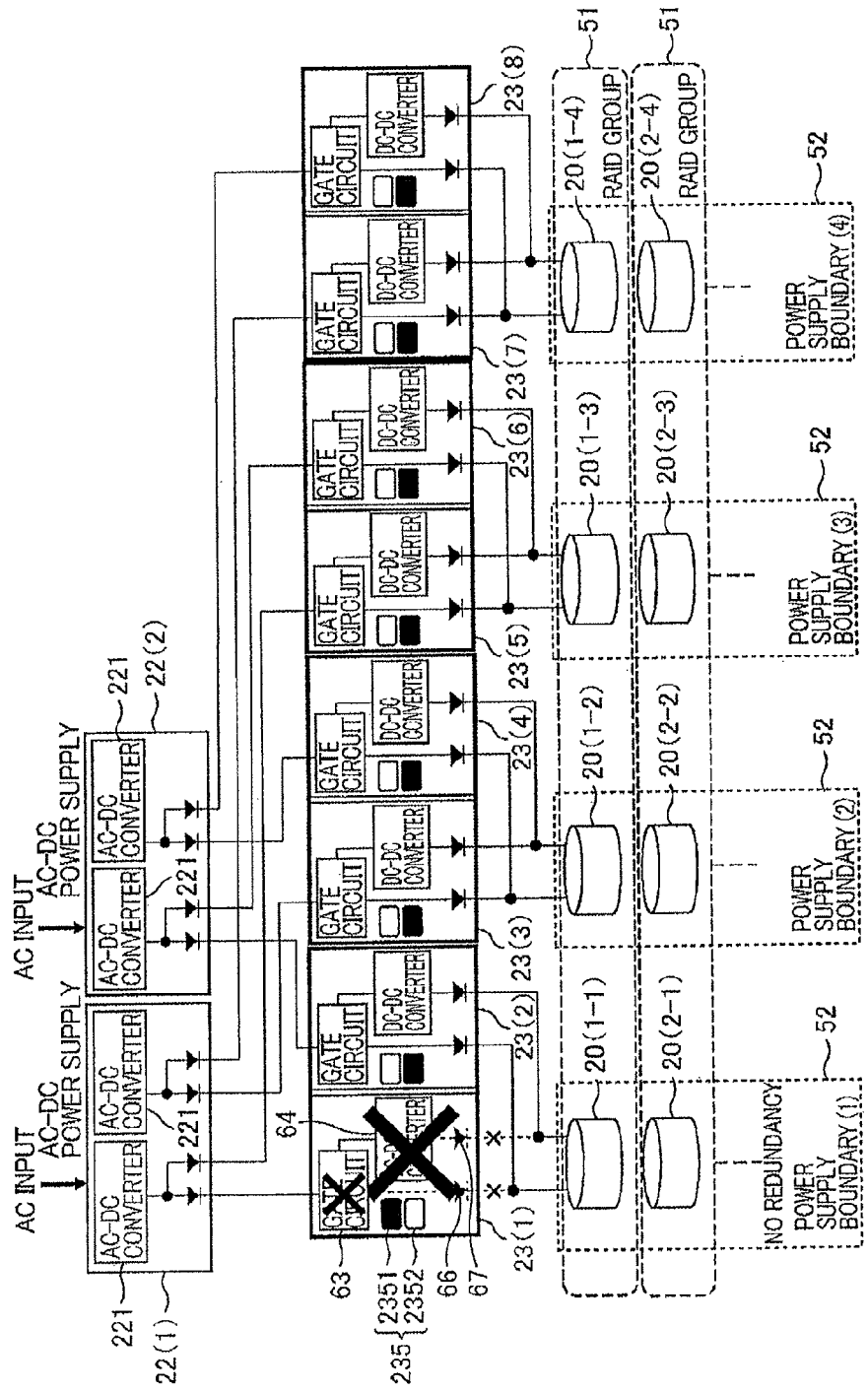
FIG. 10 is a drawing showing an operational state of the storage apparatus 10 when a failure occurs in the gate unit 23.

FIG. 10 is a case where a failure occurs in the gate unit 23(1) and the supply of the first voltage and second voltage from the gate unit 23(1) to the power supply boundary 52(1) is stopped.

As shown in FIG. 10, even if a failure occurs in the gate unit 23(1), supply of the first voltage and second voltage from the gate unit 23(2) to the power supply boundary 52(1) continues. Accordingly, the operation of the storage drive 20 belonging to the power supply boundary 52(1) is not affected and the redundancy of the RAID group 51 is also ensured. However, since the gate unit 23(1) is not functioning, the redundancy of the gate unit 23 (the redundancy of the power supply path) to the power supply boundary 52(1) is lost.

Note that the states of the indicator 235 provided in each of the gate units 23 are also shown in the drawing. The indicator 235 indicates an operation state of the gate unit 23 based on signals and the like which are acquired from the first voltage abnormality detection circuit 61, the protection circuit 62, and the second voltage abnormality detection circuit 65 of the gate unit 23. The indicator 235 is provided, for example, proximate the corresponding gate unit 23 or in a predetermined position of the drive chassis 102. An operator or the like of the storage apparatus 10 can easily figure out the state of power supply to the power supply boundary 52 from the lighting state of the indicator 235.

In this example, the indicator 235 is configured of two LEDs 2351, 2352. The LED 2351 thereof indicates whether the supply of the first voltage or the second voltage of the corresponding gate unit 23 is normal or abnormal. In the case of the present embodiment, the LED 2351 is turned on when the supply state of the first voltage or the second voltage is abnormal, and is turned off when the supply state of the first voltage or the second voltage is normal.

Also, the LED 2352 indicates whether or not the corresponding gate unit 23 is currently supplying the first voltage and the second voltage to the power supply boundary 52. In the embodiment, the LED 2352 is turned on when the gate unit 23 is supplying the first voltage and the second voltage to the power supply boundary 52 and is turned off when the gate unit 23 is not supplying the first voltage and the second voltage to the power supply boundary 52.

In the example, the supply of the first voltage or second voltage to the gate unit 23(1) is abnormal. Accordingly, the LED 2351 is turned on. Also, the gate unit 23(1) is not currently supplying the first voltage and the second voltage to the power supply boundary 52(1), and thus the LED 2352 is turned off.

The gate units 23(2) to (8) are normally supplying the first voltage and the second voltage, and thus all the LEDs 2351 are turned off. Also, all the gate units 23(2) to (8) are currently supplying the first voltage and the second voltage to the power supply boundaries 52(1) to (4) in the respective supply destinations, and thus all the LEDs 2352 are turned on.

Figure 11:
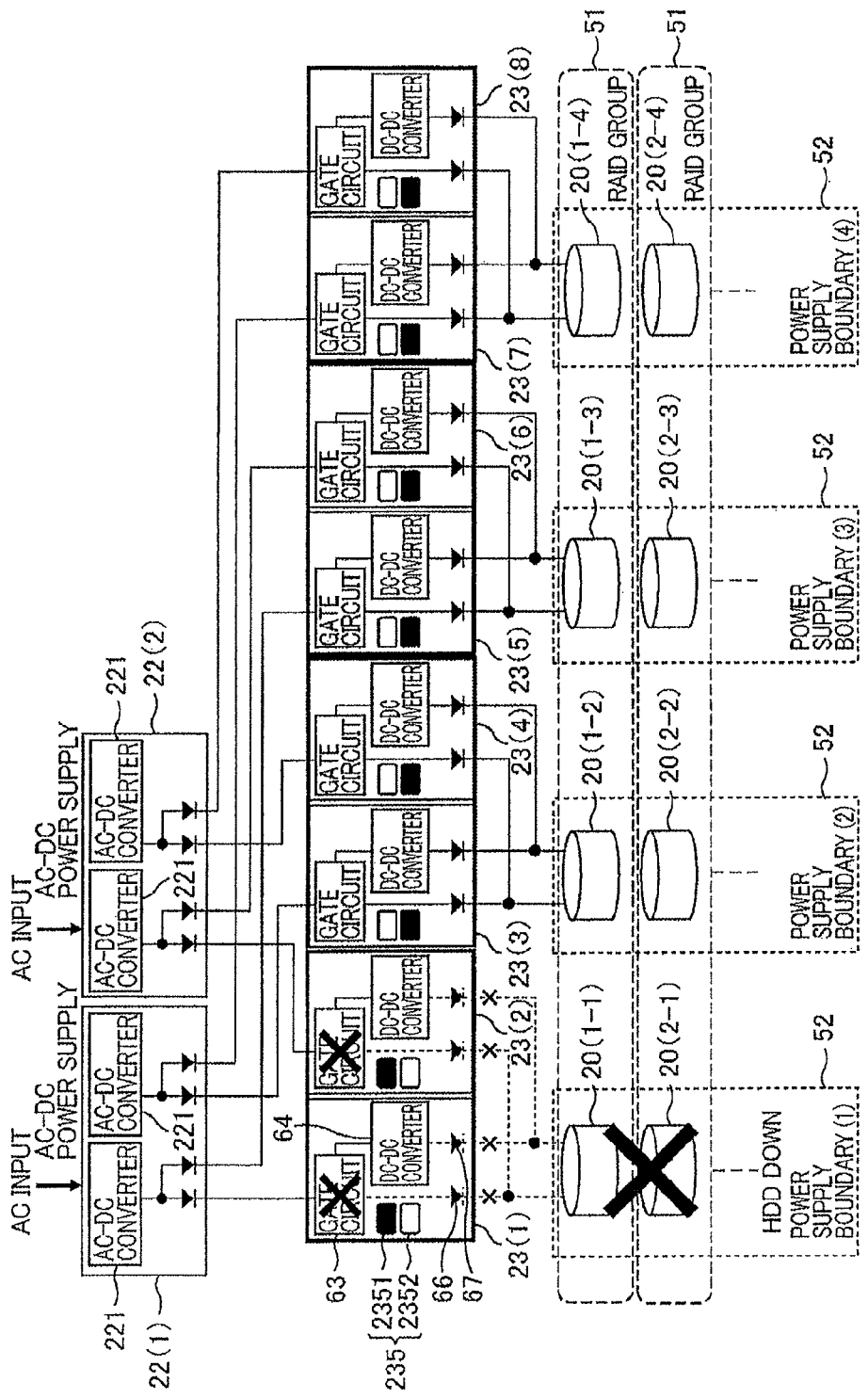
FIG. 11 is a drawing showing an operational state of the storage apparatus 10 when a failure (such as a failure of a power supply short circuit) occurs in the storage apparatus 10.

FIG. 11 is a case where a failure (such as a power supply short circuit) occurs in the storage drives 20 belonging to the power supply boundary 52(1) and both of the gate units 23(1), (2) detect an excess current, whereby the supply of the drive power to the power supply boundary 52(1) is stopped.

In this case, all the storage drives 20 belonging to the power supply boundary 52(1) stop, and as a result of it, the redundancy for each RAID group 51 is lost. Note that the number of the storage drives 20 having a failure is only one for each RAID group 51. Thus, all the storage drives 20 belonging to the power supply boundary 52(1) can restore data.

Note that if the storage apparatus 10 includes a hot spare function or a hot swap function, the data of the storage drives 20 belonging to the power supply boundary 52(1) can be restored without stopping the service to the server apparatus 2.

As described above, the storage apparatus 10 of the present embodiment would not lose data even when a failure occurs in the storage drive 20. Accordingly, the effect of the failure can be suppressed to a minimum.

Note that in this example, failures have occurred in both of the gate units 23(1) and (2), and thus both LEDs 2351 are turned on. Also, both of the gate units 23(1) and (2) are not currently supplying drive power to the power supply boundary 52(1), and thus the LEDs 2352 thereof are all turned off.

Other gates units 23(3) to (8) are normally supplying the first voltage and the second voltage, and thus the LEDs 2351 of the gate units 23(3) to (8) are all turned off. Also, all of them are currently supplying the first voltage and the second voltage to the respective supply destinations of the power supply boundaries 52(2) to (4), and thus these LEDs 2352 are turned on.

As described above, even when a failure occurs in a storage drive 20 belonging to some power supply boundary 52, in the storage apparatus 10 of the present embodiment, only the gate unit 23 supplying drive power to the corresponding power supply boundary 52 is stopped. Thus, a case in which other power supply boundaries 52 are affected therewith does not occur.

Figure 12:
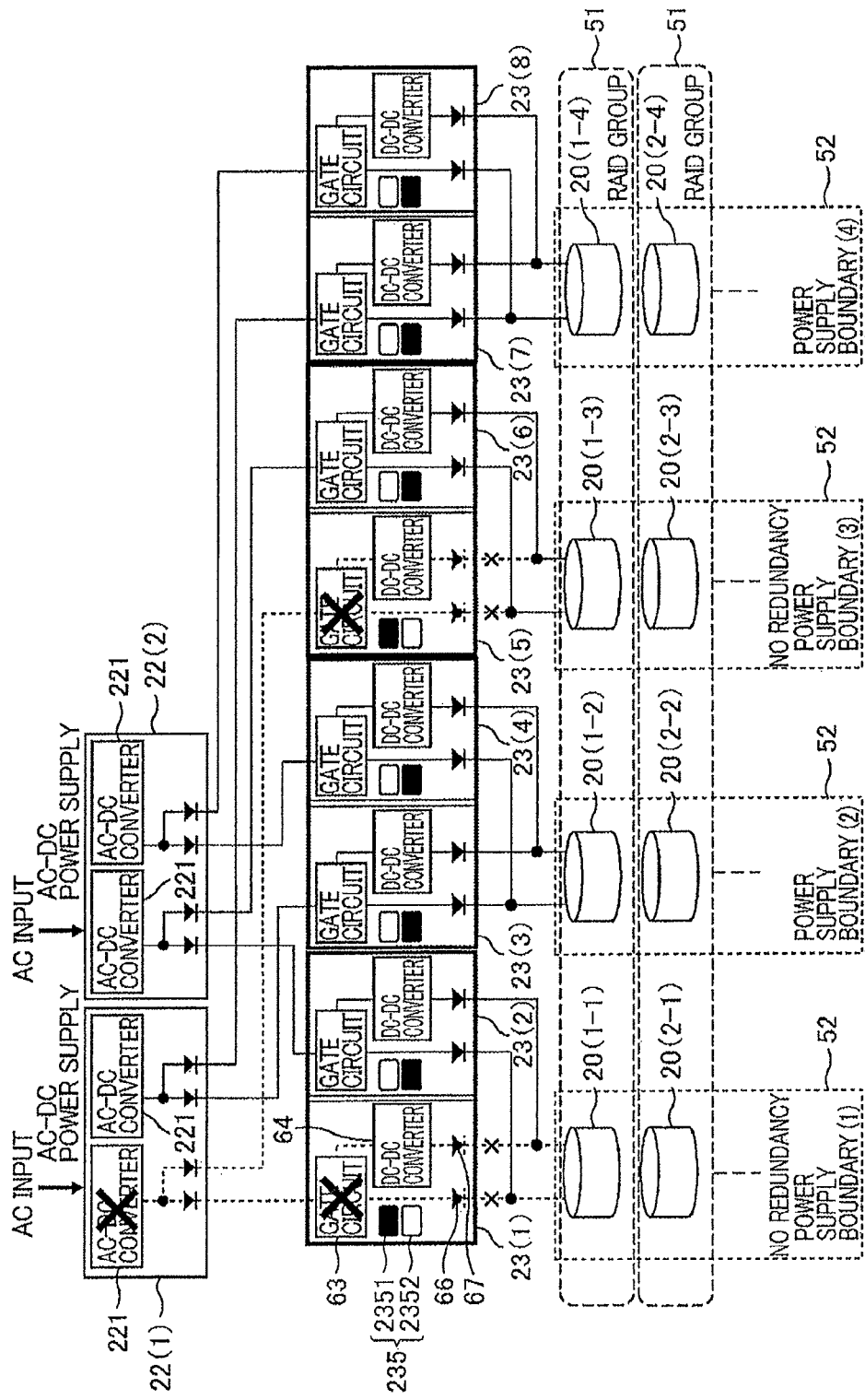
FIG. 12 is a drawing showing an operational state of the storage apparatus 10 when a failure occurs in an AC-DC power supply 22.

FIG. 12 is a case where a failure occurs in the AC-DC power supply 22(1) and the supply of the first voltage from the AC-DC power supply 22(1) to the gate units 23(1), (5) is stopped.

In this example, the supply of the first voltage from the AC-DC power supply 22(1) is stopped, and the supply of the first voltage and second voltage from the gate unit 23(1) to the power supply boundary 52(1) and the supply of the first voltage and second voltage from the gate unit 23(5) to the power supply boundary 52(3) are both stopped.

As shown in FIG. 12, in this example, the supply of the first voltage and second voltage from the gate unit 23(2) to the power supply boundary 52(1) continues, which does not effect the operations of respective storage drives 20 belonging to the power supply boundary 52(1). Similarly, the supply of the first voltage and second voltage from the gate unit 23(6) to the power supply boundary 52(3) continues, having no effect on the operations of respective storage drives 20 belonging to the power supply boundary 52(3). Accordingly, the redundancy of each RAID group 51 is ensured.

However, since the gate unit 23(1) is not functioning, the redundancy of the gate unit 23 for the power supply boundary 52(1) is lost. Also, since the gate unit 23(5) is not functioning, the redundancy of the gate unit 23 for the power supply boundary 52(3) is lost.

In this manner, in the storage apparatus 10 of the present embodiment, when a failure occurs in the AC-DC power supply 22(1) and the supply of the first voltage from the AC-DC power supply 22(1) to the gate units 23(1), (5) is stopped, the redundancy of the gate unit 23 in the power supply boundary 52(3) is lost but the redundancy of the RAID group 51 is ensured.

Note that in this example, the LEDs 2351 of the gate units 23(1), (5) are turned on corresponding to the abnormality of the supply of the first voltage or second voltage. Also, the gate unit 23(1) and the gate unit 23(5) are not currently supplying the first voltage and the second voltage to the power supply boundary 52(1) and the power supply boundary 52(3), respectively, therefore the LEDs 2352 of both gate units 23(1), (5) are turned off.

On the other hand, since all of the gate units 23(2) to (4), (6), (8) are normally supplying the first voltage and second voltage, all the LEDs 2351 are also turned off. Also, since all of them are currently supplying the first voltage and second voltage to the power supply boundaries 52(1) to (4) in the supply destinations, all the LEDs 2352 are also turned on.

Figure 13:
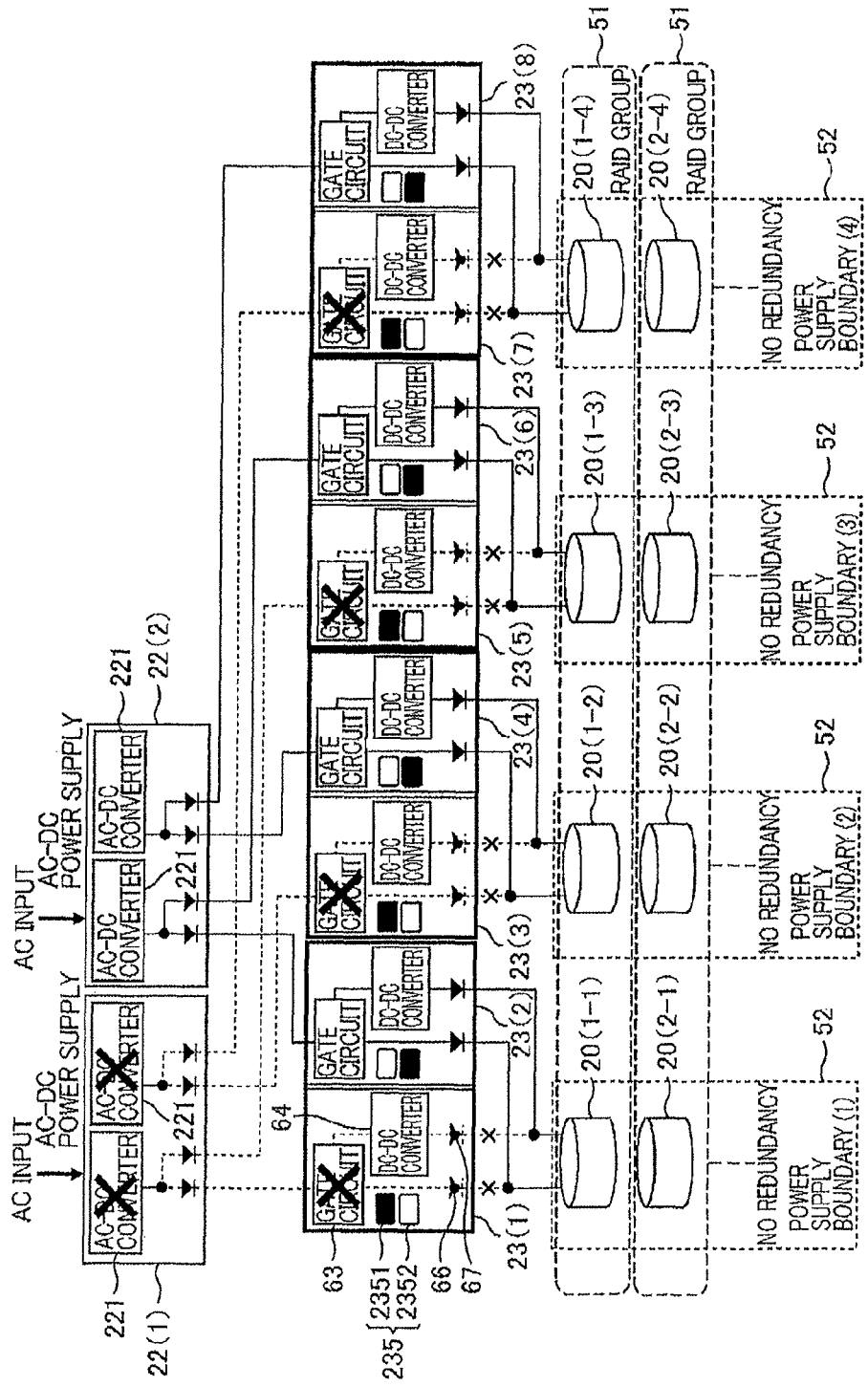
FIG. 13 is a drawing showing an operational state of the storage apparatus 10 when a failure occurs in the AC-DC power supply 22.

FIG. 13 is a case where a failure occurs in the AC-DC power supply 22(1) (the AC-DC power supply 22(1) has completely gone down) and the supply of the first voltage to the gate units 23(1), (3), (5), (7) has stopped.

In this example, since the supply of the first voltage from the AC-DC power supply 22(1) is stopped, stopped are all of the supply of the first voltage and second voltage from the gate unit 23(1) to the power supply boundary 52(1), the supply of the first voltage and second voltage from the gate unit 23(3) to the power supply boundary 52(1), the supply of the first voltage and second voltage from the gate unit 23(5) to the power supply boundary 52(3), and the supply of the first voltage and second voltage from the gate unit 23(7) to the power supply boundary 52(4).

As shown in FIG. 13, in this example, the supply of the first voltage and second voltage from the gate unit 23(2) to the power supply boundary 52(1) continues. Accordingly, the operations of the respective storage devices 20 belonging to the power supply boundary 52(1) are not affected.

Similarly, the supply of the first voltage and second voltage from the gate unit 23(4) to the power supply boundary 52(2) continues. Accordingly, the operations of the respective storage drives 20 belonging to the power supply boundary 52(2) are not affected.

Likewise, the supply of the first voltage and second voltage from the gate unit 23(6) to the power supply boundary 52(3) continues. Accordingly, the operations of the respective storage drives 20 belonging to the power supply boundary 52(3) are not affected.

Likewise, the supply of the first voltage and second voltage from the gate unit 23(8) to the power supply boundary 52(4) continues. Accordingly, the operations of the respective storage devices 20 belonging to the power supply boundary 52(4) are not affected.

In addition, all the power supply boundaries 52(1) to (4) maintain supply of drive power. Thus, the redundancy of each RAID group 51 is ensured.

However, since the gate unit 23(1) is not functioning, the redundancy of the gate unit 23 for the power supply boundary 52(1) is lost. Also, since the gate unit 23(3) is not functioning, the redundancy of the gate unit 23 for the power supply boundary 52(2) is lost. Also, since the gate unit 23(5) is not functioning, the redundancy of the gate unit 23 for the power supply boundary 52(3) is lost. Also, since the gate unit 23(7) is not functioning, the redundancy of the gate unit 23 for the power supply boundary 52(4) is lost.

In this manner, when a failure occurs in the AC-DC power supply 22(1) and the supply of the first voltage to the gate units 23(1), (3), (5), (7) is stopped in the storage apparatus 10 of the present embodiment, the redundancy of the gate unit 23 is lost but the redundancy of the RAID group 51 can be ensured.

Note that in this example, with regard to the gate units 23(1), (3), (5), (7), the LEDs 2351 are turned on corresponding to the abnormality of the supply of the first voltage or second voltage. Also, the gate unit 23(1), the gate unit 23(3), the gate unit 23(5) and the gate unit 23(7) are not currently supplying the first voltage and the second voltage to the power supply boundary 52(1), the power supply boundary 52(2), the power supply boundary 52(3), and the power supply boundary 52(4), respectively, and thus these LEDs 2352 are turned off.

On the other hand, since all of the gate units 23(2), (4), (6), (8) are normally supplying the first voltage and the second voltage, all the LEDs 2351 are turned off. Also, since all of them are currently supplying the first voltage and the second voltage to the power supply boundaries 52(1) to (4) in the supply destinations, the LEDs 2352 are all turned on.

As described above, in the storage apparatus 10 of the present embodiment, even when a failure (a complete down) occurs in one of the redundantly provided AC-DC power supplies 22, only one of the gate units 23, redundantly provided for each power supply boundary 52, is stopped, and the supply of drive power from the other gate unit 23 to each power supply boundary 52 would not be stopped.

<Providing Failure-Related Information>

When a failure occurs in the drive chassis 102, the maintenance device 17 creates information relating to the failure (hereinafter, referred to as failure-related information) based on information acquired from the gate unit 23. Then, the maintenance device 17 provides a user such as an operator with the created failure-related information via a display, for example.

Figure 14:
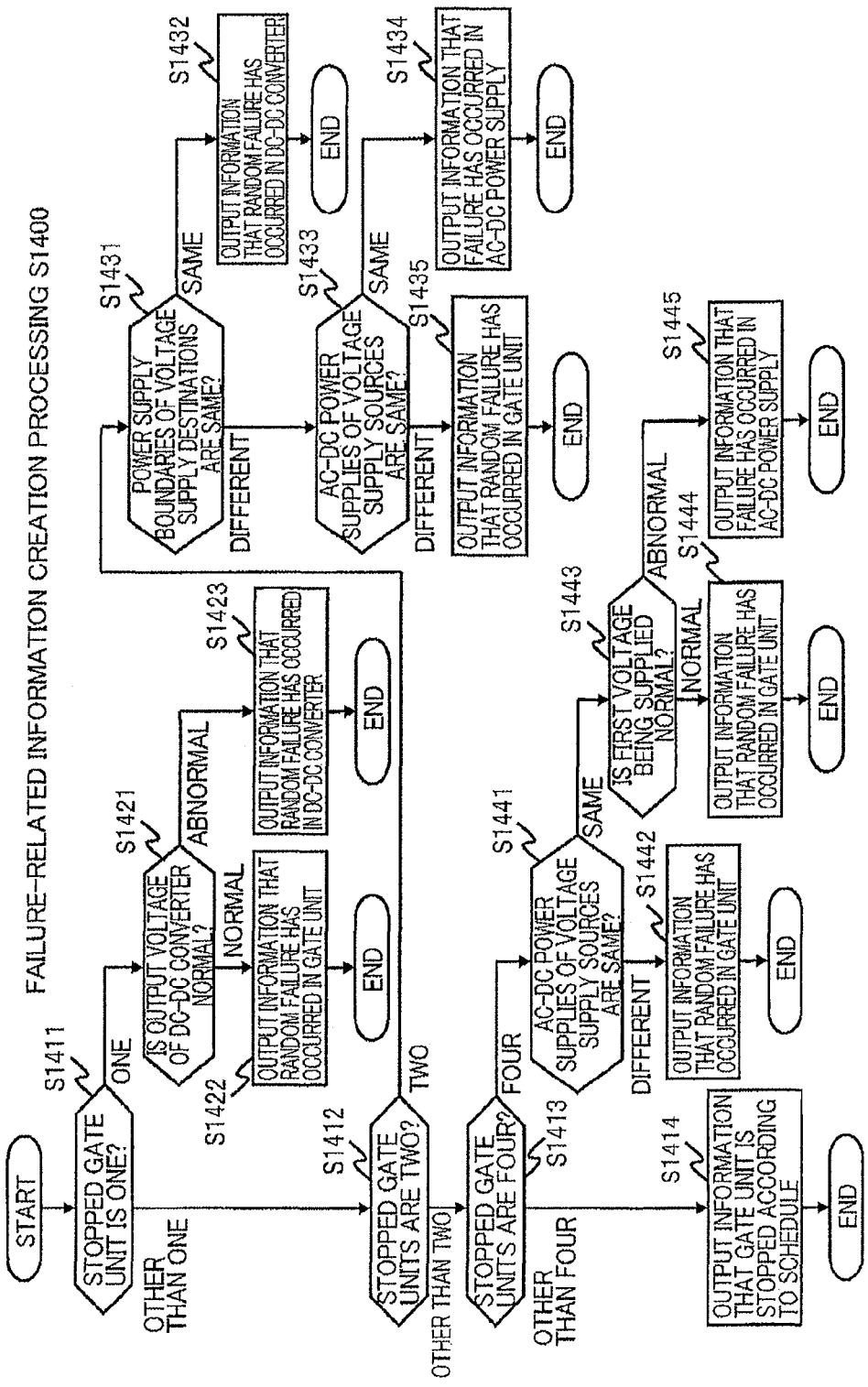
FIG. 14 is a flowchart illustrating failure-related information creation processing S1400.

FIG. 14 is a flowchart illustrating processing (hereinafter, referred to as failure-related information creation processing S1400) performed by the maintenance device 17 when failure-related information is created. Hereinafter, a failure-related information creation processing S1400 is described with reference to the drawing.

The maintenance device 17 firstly determines based on information acquired from the respective gate units 23 whether or not only one gate unit 23 is stopped by a failure (S1411). When only one gate unit 23 is stopped by a failure (S1411: One), the processing proceeds to S1421, and when the stopped gate unit 23 is not only one (S1411: other than one), the step proceeds to S1412.

Note that the maintenance device 17 determines whether or not each gate unit 23 is stopped based on, for example, an input voltage of the protection circuit 62 (a voltage supplied from the AC-DC power supply 22), an output voltage of the DC-DC converter 64, a first voltage abnormality detection signal to be input from the first voltage abnormality detection circuit 61 to the gate circuit 63, and a second voltage abnormality detection signal to be input from the second voltage abnormality detection circuit 65 to the gate circuit 63 or the DC-DC converter 64.

At S1421, the maintenance device 17 determines whether or not the output voltage of the DC-DC converter 64 of the stopped gate unit 23 is normal. When the output voltage of the DC-DC converter 64 of the stopped gate unit 23 is normal (S1421: Normal), the maintenance device 17 outputs information indicating that a random failure has occurred in the gate unit 23 (S1422).

On the other hand, when the output voltage of the DC-DC converter of the gate unit 23 is abnormal (S1421: Abnormal), the maintenance unit 17 outputs information indicating that a random failure has occurred in the DC-DC converter 64 of that gate unit 23 (S1423).

Note that a user determines whether or not the gate unit 23 needs to be replaced based on the information outputted by the maintenance device 17.

At S1412, the maintenance device 17 determines based on the information acquired from each gate unit 23 whether or not only two gate units are stopped by a failure. When only two gate units 23 are stopped (S1412: Two), the processing proceeds to S1431. When the stopped gate unit 23 is not only two (S1412: Other than two), the step proceeds to S1413.

At S1431, the maintenance device 17 determines whether or not the power supply boundaries 52 in the drive power supply destinations of the gate units 23 are the same. Note that the maintenance device 17 stores the power supply boundaries 52 in the supply destinations of the respective gate units 23 mounted on the drive chassis 102 and uses this information to make the above described determination.

When the two stopped gate units 23 supply the same power supply boundary 52 with drive power (S1431: Same), the maintenance device 17 outputs information indicating that a failure (such as a failure of short-circuit) has occurred in the storage drive 20 belonging to that power supply boundary 52 (S1432).

On the other hand, when the two stopped gate units 23 supply different power supply boundaries 52 with drive power (S1431: Different), the maintenance device 17 determines whether or not the two stopped gate units 23 are receiving a first voltage from the same AC-DC power supply 22 (S1433). Note that the maintenance device 17 has stored the AC-DC power supplies 22 from which the respective gate units 23 mounted on the drive chassis 102 receive the first voltage and uses this information to make the determination.

When the two stopped gate units 23 is supplied the first voltage from the same AC-DC power supply 22 (S1433: Same), the maintenance device 17 outputs information that a failure has occurred in the AC-DC power supply 22 (S1434).

On the other hand, when the two stopped gate units 23 receive the first voltage from different AC-DC power supplies 22 (S1433: Different), the maintenance device 17 outputs information that random failures have occurred in the two stopped gate units 23 (S1435).

Note that a user determines based on the information outputted from the maintenance device 17 how to deal with the failure (e.g., whether or not the storage drive 20 needs to be replaced, whether or not the AC-DC power supply 22 needs to be replaced, whether or not the two gate units 23 need to be replaced, or the like)

At S1413, the maintenance device 17 determines based on the information acquired from each gate unit 23 if only four gate units 23 are stopped by a failure. When the stopped gate units 23 are only four (S1413: Four), the processing proceeds to S1441.

On the other hand, when the stopped gate units 23 are not only four (S1413: Other than four), the maintenance device 17 outputs information that the gate units 23 are stopped by another reason such as a scheduled stop (S1414).

At S1441, the maintenance device 17 determines whether or not the four stopped gate units 23 are all receiving a first voltage from the same AC-DC power supply 22. When the four stopped gate units all do not receive the first voltage from the same AC-DC power supply 22 (S1441: Different), the maintenance device 17 outputs information indicating that a random failure has occurred in these four gate units (S1442).

On the other hand, when the four stopped gate units 23 all receive the first voltage from the same AC-DC power supply 22 (S1441: Same), the maintenance device determines whether or not the first voltage supplied to the four stopped gate units 23 is normal (S1443). When the first voltage supplied to the four stopped gate units 23 is normal (S1443: Normal), the maintenance device 17 outputs information indicating that a random failure has occurred in the four gate units 23 (S1444).

On the other hand, when the first voltage supplied to these four gate units 23 is abnormal (S1443: Abnormal), the maintenance device 17 outputs information indicating that a failure has occurred in the AC-DC power supply 22 (S1445).

Note that a user determines based on the information outputted from the maintenance device 17 whether or not the AC-DC power supply 22 needs to be replaced, for example.

Figure 15:
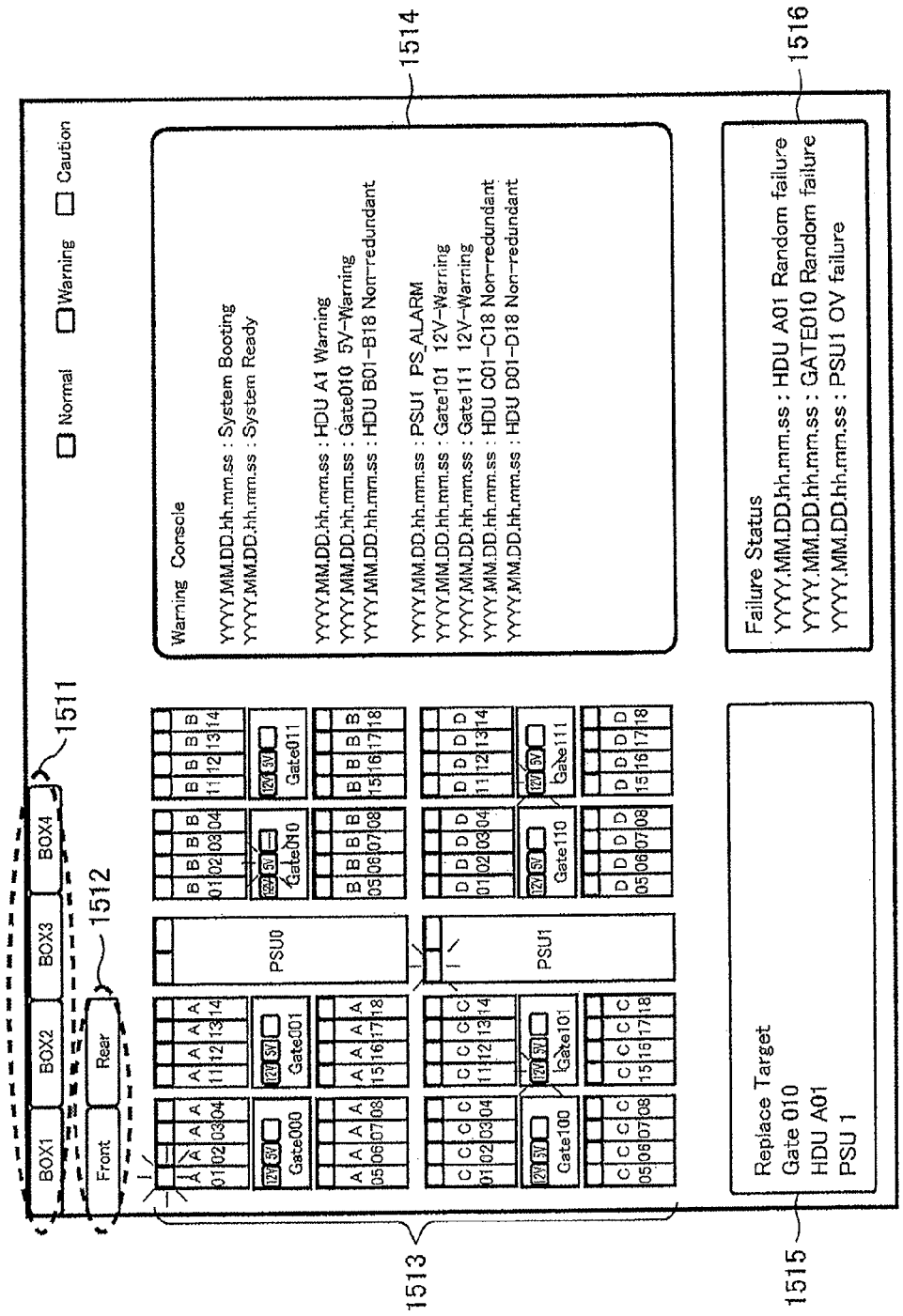
FIG. 15 shows an example of a management screen 1500.

FIG. 15 is a screen that the maintenance device 17 displays on the display when providing a management function of the storage apparatus 10 mounted on the drive chassis 102 (hereinafter referred to as management screen 1500).

As shown in FIG. 15, the management screen 1500 is provided with a drive chassis 102 selection field (hereinafter referred to as a chassis selection field 1511), a component side of drive chassis 102 selection field (it is assumed that the drive chassis 102 of the present embodiment has component sides on the front and the rear, respectively) (hereinafter referred to as a component side selection field 1512), a field in which the operation state and the like of the components are shown (hereinafter referred to as a state display field 1513), a field in which there is displayed, in chronological order, information notified from the component of the storage apparatus 10, such as an execution state of the processing, an alert to a user, or the like (hereinafter referred to as a log information) (hereinafter referred to as a log information display field 1514), a field in which there is displayed information such as a countermeasure against an ongoing failure (hereinafter referred to as a countermeasure information display field 1515), and a field in which there is displayed information on a cause of a current-ongoing failure, or the like (hereinafter, referred to as a failure cause information display field 1516).

For example, in the state display field 1513 among the above, a display is made in a manner such that a user can easily see the respective operating states (normal, abnormal (existence of a failure), attention (no redundancy and the like)) of the storage drives 20 (A01, A02, A03, ... ), the AC-DC power supplies 22 (PSU0, PSU1), and the gate units 23 (Gate000, Gate001, ... ).

Also, in the log information display field 1514, displayed is information (an operational performance log, a status log, caution information (Caution), warning information (Warning)) outputted from each component of the storage apparatus 10 mounted on the drive chassis 102.

In the countermeasure information display field 1515, displayed is information on handling and countermeasure that may be effective for a user to take against a current-ongoing failure. For example, indication of which component or part should be replaced is displayed.

In the failure cause information display field 1516, displayed is information that may be useful for a user to identify the cause of a current-ongoing failure, such as the location of a component with the failure, the at which the component failed, or the like.

Referring the management screen 1500 displayed by the maintenance device 17, the user can easily and quickly figure out the operating states or failure states of the components of the storage apparatus 10 mounted on the drive chassis 102. Also, referring to the management screen 1500, the user can quickly adopt a countermeasure necessary and effective for the current-ongoing failure.

<Example of RAID Group>

The foregoing description has been given of the case where the storage drives 20 configure a RAID group 51 in the RAID5 (3D+1P) system. However, the system of the RAID group 51 is not limited to this. For example, even when the storage drives 20 configure a RAID group 51 of another system such as RAID 5 (7D+1P, 14D+2P), RAID 6 (6D+2P), or RAID 1 (2D+2D, 4D+4D), similar functions can be implemented. In summary, as long as the storage drives 20 belonging to the same RAID group 51 are set to belong to different power supply boundaries 52, respectively, a storage apparatus 10 featured with safe/reliable drive power supply and safe/reliable data stored in the storage drives 20, can be achieved.

Figure 16:
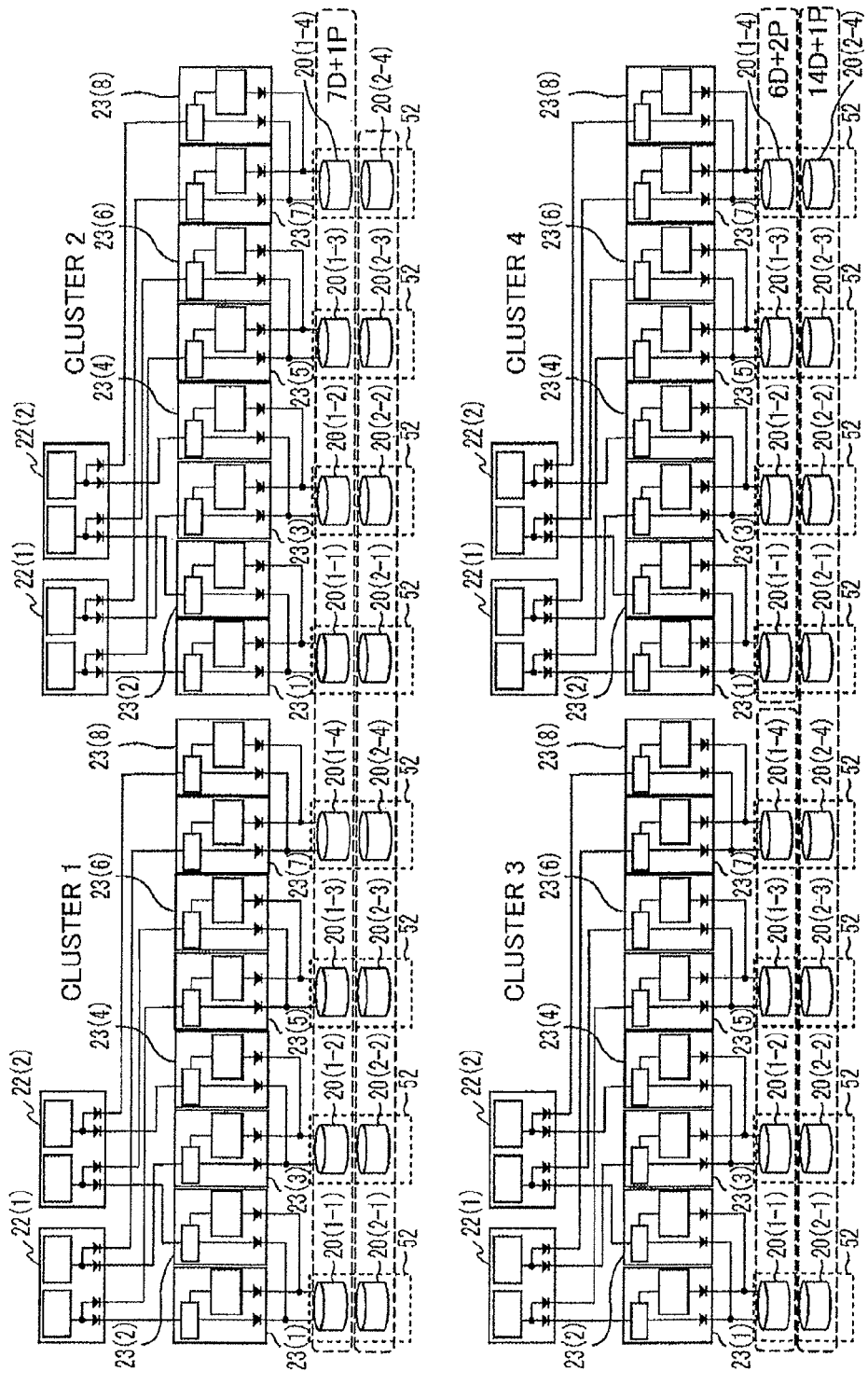
FIG. 16 shows an example of a supply mode of drive power.

FIG. 16 shows an example of a supply mode of the drive power when the RAID5 (3D+1P, 7D+1P, 14D+2P), RAID6 (6D+2P) or the like are configured so that the storage drives 20 each belong to different power supply boundaries 52 in the storage apparatus 10 including four component sides (Clusters 1 through 4).

In a case where unused storage drives 20 mounted on the drive chassis 102 are to be used to set a new RAID group 51, the unused storage drives 20 configuring the RAID group 51 are selected according to an assignment rule set in advance by a user.

<Setting RAID Group>

Figures 17, 18:
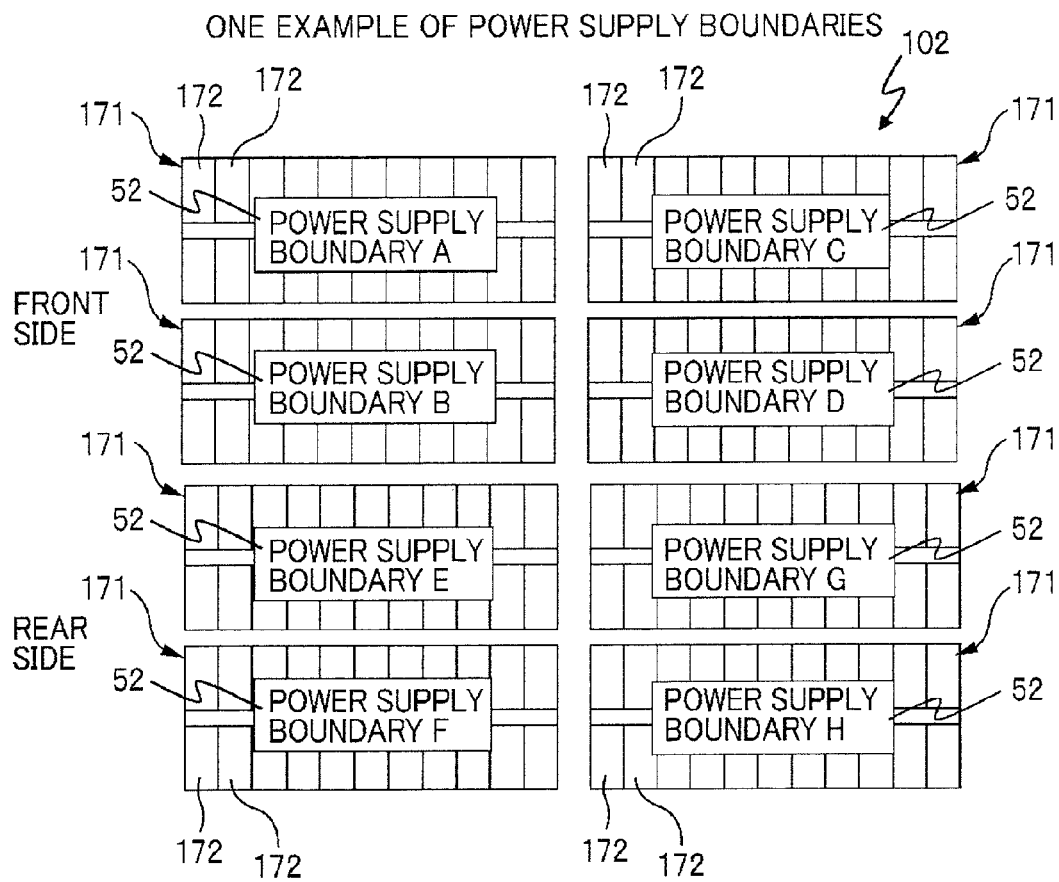
FIG. 17 shows an example of power supply boundaries 52 set in insert portions (slots) of a storage drive 20 on a mounting surface of a drive chassis 102.
FIG. 18 shows an example of an assignment management table 1800.

FIG. 17 is an example of the power supply boundaries 52 set in mounting portions (hereinafter referred to slots 172) of the storage drive 20 of the component sides 171 provided to the drive chassis 102. In addition, FIG. 18 is an example of an assignment management table 1800 stored in the maintenance device 17 as the above mentioned assignment rule which is referred when selecting unused storage drives 20 mounted on the slots 172 of the component sides 171 shown in FIG. 17 when setting a new RAID group 51.

As shown in FIG. 18, the assignment rule of the component sides of the storage drives 20 is set in the assignment management table 1800 for each combination of the RAID system 1811 and the RAID configuration 1812 (a power supply boundary assignment configuration 1813). For example, in this assignment management table 1800, when the RAID group 51 with the RAID5 (3D+1P) configuration is set, the rules are that one storage drive 20 is selected from each of the four power supply boundaries 52A to D. Also, when the RAID group 51 with the RAID5 (7D+1P) configuration is set, the rules are that one storage drive 20 is selected from each of the eight power supply boundaries 52A to H. Also, when the RAID group 51 with the RAID6 (6D+2P) configuration is set, the rules are that one storage drive 20 is selected from each of the eight power supply boundaries 52A to H.

The maintenance device 17 manages the setting state of the RAID group 51 in a drive management table 1900 shown in FIG. 19 and a RAID management table 2000 shown in FIG. 20, for example. The maintenance device 17 sets the configuration of the storage apparatus 10 according to these tables.

As shown in FIG. 19, the drive management table 1900 manages correspondences of relationships between the power supply boundaries 52 and the storage drives 20 (a power supply boundary 1911 and a drive number 1912 (an identifier of the storage drive 20)) and use states of each storage drive 20 (a RAID-assignment flag 1913 indicating that the storage drive is already assigned to RAID).

As shown in FIG. 20, the RAID management table 2000 manages therein correspondences between the RAID group 51 (RAID-ID 2011 (an identifier of the RAID group 51)) and the storage drive 20 belonging to the RAID group 51 (a drive number 2012 (an identifier of the storage drive 20)), and the power supply configuration 2013 of each storage drive 20.

Figure 21:
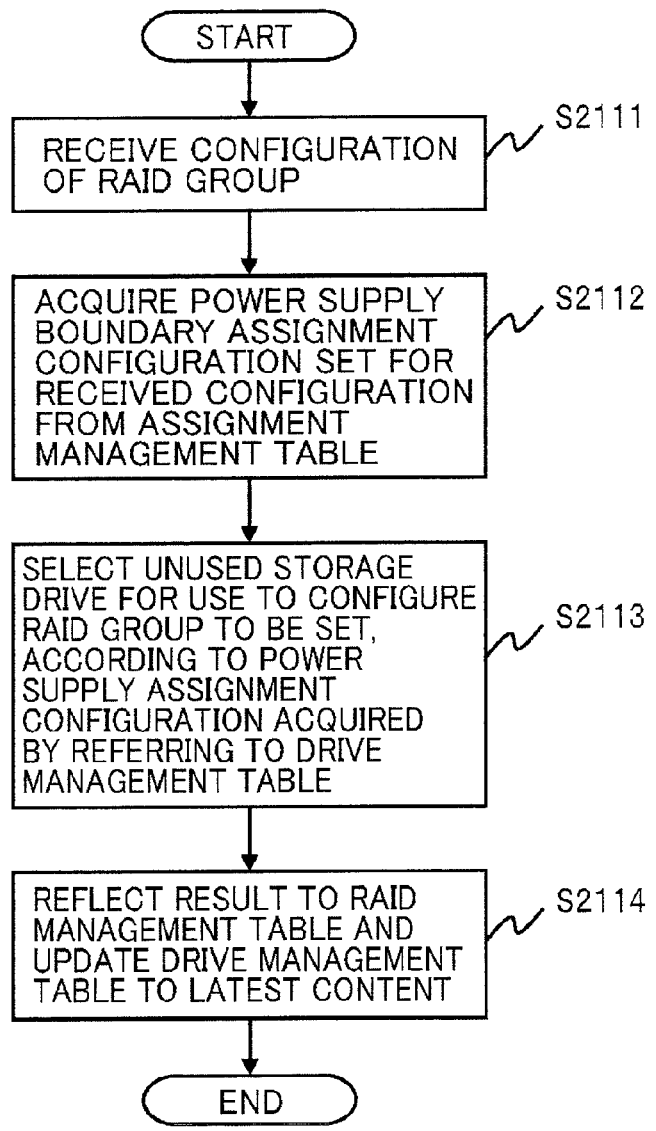
FIG. 21 shows a flowchart illustrating a RAID group setting processing S2100.

FIG. 21 is a flowchart illustrating processing which is performed by the maintenance device 17 (hereinafter referred to as a RAID group setting processing S2100) while a support environment (a user interface) is provided to a user when the user sets a new RAID group 51. Hereinafter, the RAID group setting processing S2100 is described with reference to FIG. 21.

Firstly, the maintenance device 17 receives an input on the configuration (contents corresponding to RAID configuration 1812 of assignment management table 1800 of FIG. 18) of the RAID group 51 intended to be set by the user (S2111). Then, the maintenance device 17 acquires the power supply boundary assignment configuration 1813 which is set for the received RAID configuration 1812 from the assignment management table 1800 (S2112).

After that, the maintenance device 17 refers to the drive management table 1900 and selects an unused storage drive 20 (the storage drive 20 with the RAID-assignment flag 1913 set at "OFF") which is used for configuring the RAID group 51 to be set according to the power supply boundary assignment configuration 1813 acquired at S2112 (S2113). Note that this selection may be made such that this selection operation is controlled from infringing the power supply boundary assignment configuration 1813 while being allowed to be performed by the user freely.

Next, the maintenance device 17 reflects the result selected at S2113 on the RAID management table 2000 and updates the contents of the RAID-assignment flag 1913 in the drive management table 1900 to the latest contents (S2114).

As described above, the maintenance device 17 provides a user with a support environment for setting a new RAID group 51. For this reason, the user can easily set the storage drives 20 configuring the RAID group 51 to belong to different power supply boundaries 52, respectively, without being concerned of the contents of the assignment management table 1800 when setting a new RAID group 51.

<Another Configuration of the Gate Unit>

Figure 22:
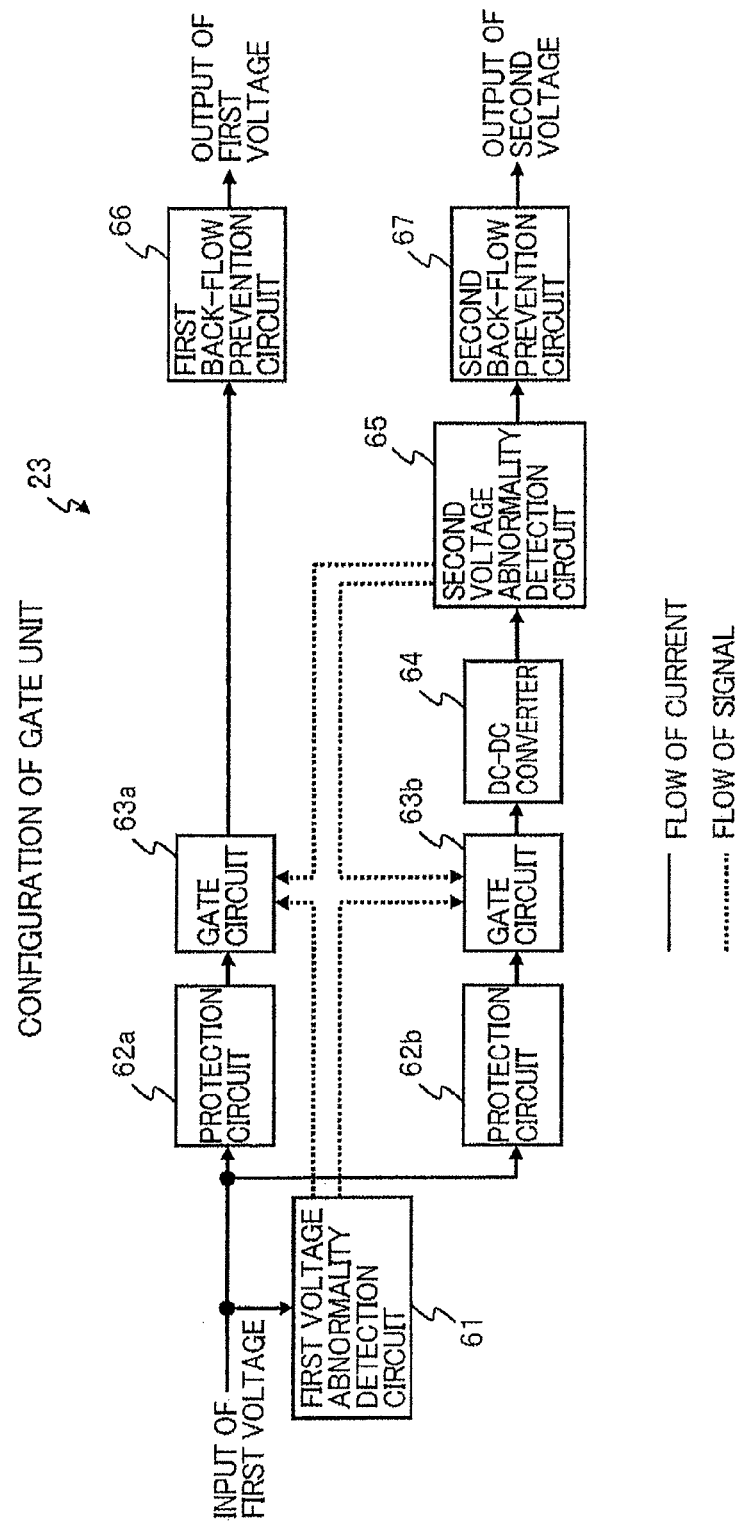
FIG. 22 shows an example of the gate unit 23.
Figure 23:
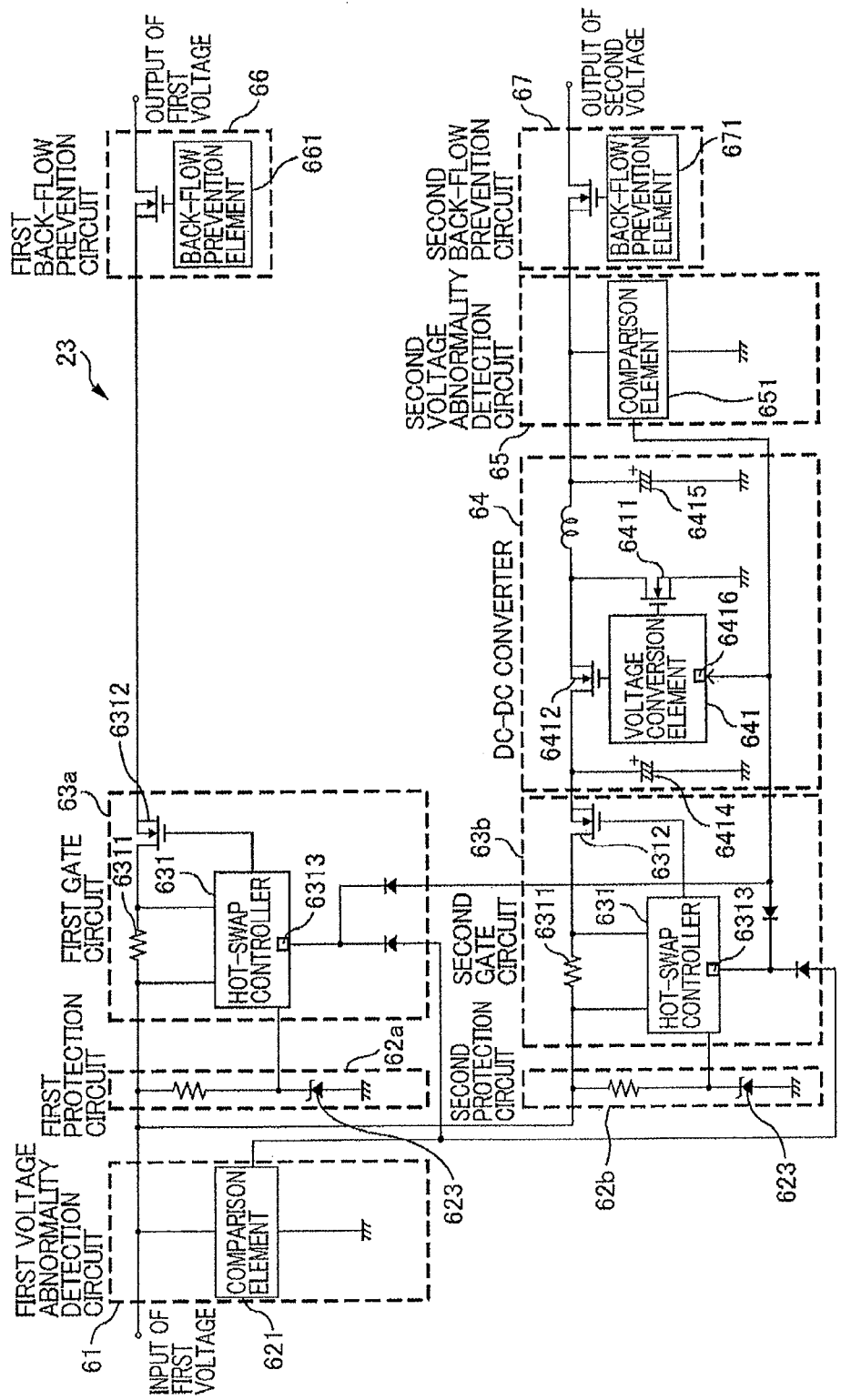
FIG. 23 shows an example of a circuit of the gate unit 23.

The gate units 23 illustrated in FIG. 6 and FIG. 7, were designed so that the supply path of the first voltage and the supply path of the second voltage share the same gate circuit 63. However, for example, when power required by the load of the gate unit 23 is large (e.g., when the number of storage drives 20 belonging to one power supply boundary 52 is large), the output path of the first voltage and the supply path of the second voltage may be respectively provided with individual gate circuits 63. FIG. 22 and FIG. 23 show an example of a gate unit with such configuration.

In the gate unit 23 shown in these drawings, the first voltage abnormality detection signal outputted from the first voltage abnormality detection circuit 61 is made to be inputted to both the first gate unit 63a and the second gate circuit 63b. Also, the second voltage abnormality detection signal outputted from the second voltage abnormality detection circuit 65 is made to be inputted to both the first gate circuit 63a and the second gate circuit 63b.

Figure 24:
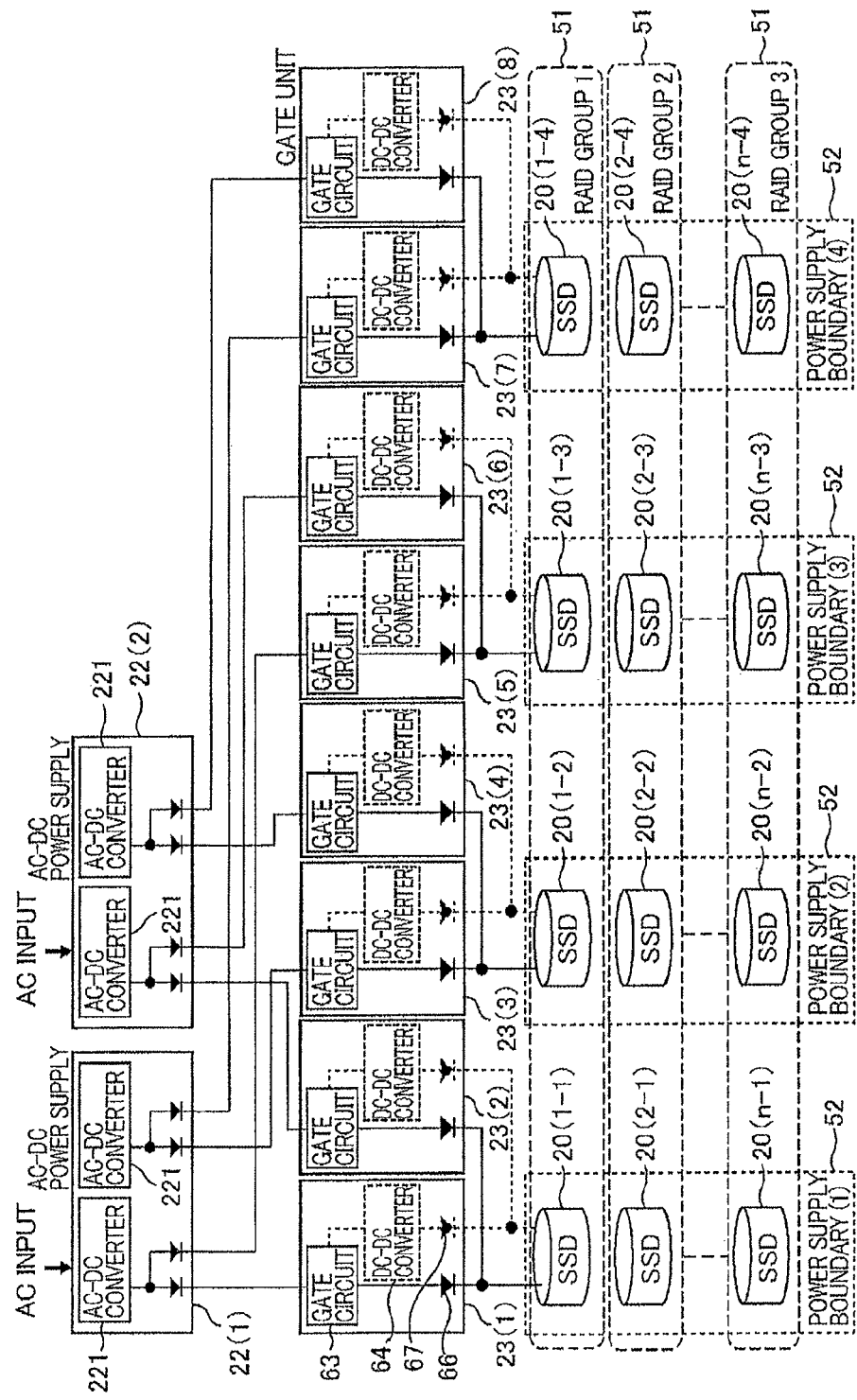
FIG. 24 shows an example of the gate unit 23.
Figure 25:
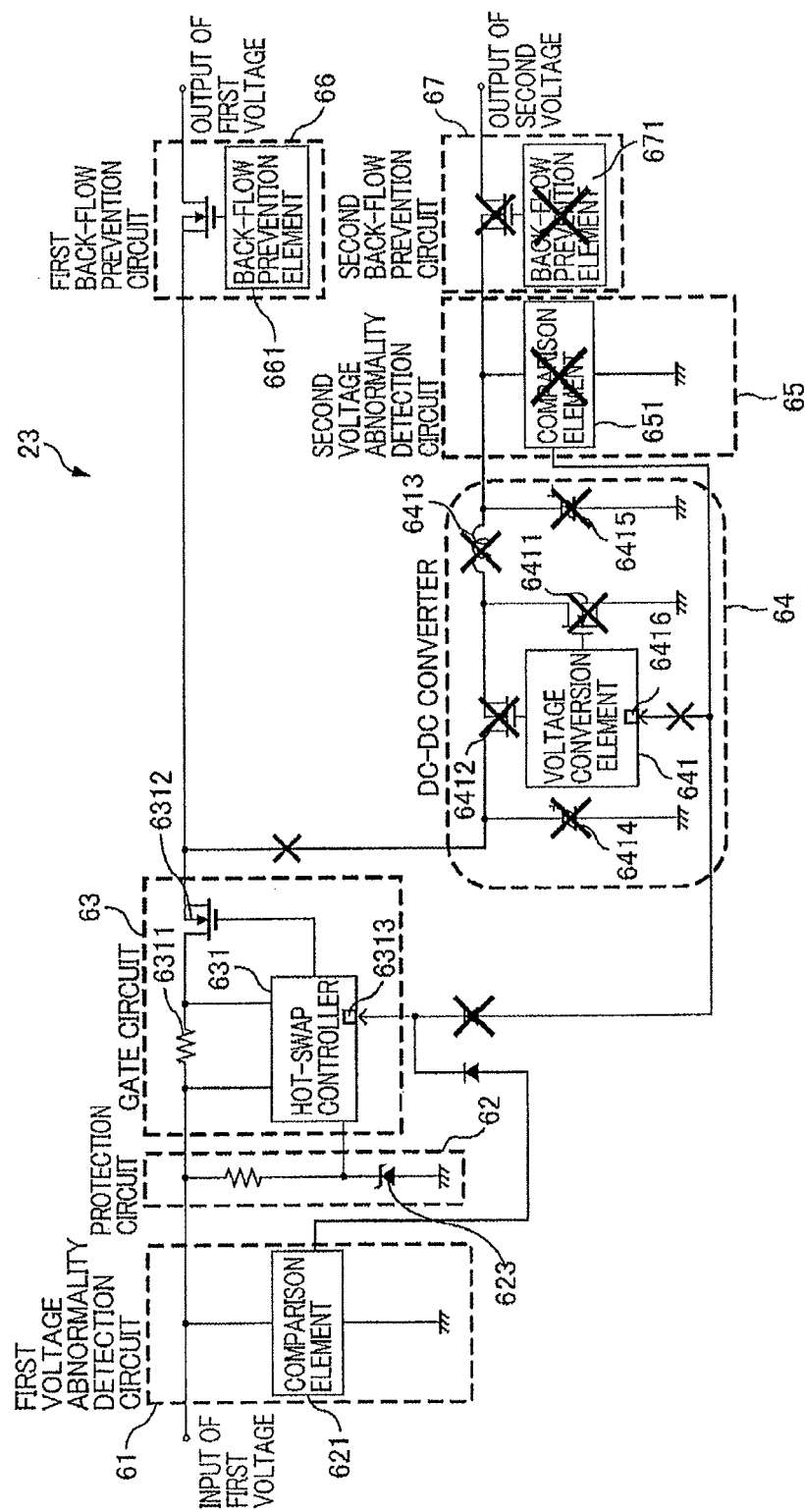
FIG. 25 shows an example of a circuit of the gate unit 23.

Also, when the load of the gate unit 23 requires only the first voltage (e.g., when the load is SSD, the load requires only 12V as drive voltage), for example, the circuit patterns shown in FIG. 7 may be modified by omitting formation of the circuit patterns for the second voltage (e.g., the circuit patterns encircled by dotted lines in the drawing) or omitting mounting of components to the circuit patterns as shown in FIG. 24 and FIG. 25.

As described above, according to the storage apparatus 10 of the present embodiment a plurality of AC-DC power supplies 22 can supply drive power to a single storage drive 20 and can ensure redundancy of the AC-DC power supply 22 for the storage drive 20.

In addition, when a failure occurs in one of the AC-DC power supplies 22, the gate unit 23 provided on a power supply path leading to the storage drive 20 from that AC-DC power supply 22 stops supplying drive power to the storage drive 20 through the power supply path from the AC-DC power supply 22. Thus, drive power can be supplied from the AC-DC power supply 22 to the storage drive 20 while disconnecting the AC-DC power supply 22 in which a failure has occurred from the above mentioned storage drive 20. For this reason, an abnormal voltage can be certainly prevented from being applied from the AC-DC power supply in which the failure has occurred to the storage drive 20.

As described above, according to the storage apparatus 10 of the present embodiment, the redundancy of the AC-DC power supplies 22 for the storage drive 20 can be ensured while certainly preventing effects (such as loss of data, or performance deterioration) on the storage drive 20 when a failure occurs in the AC-DC power supply 22.

In the storage apparatus 10 of the present embodiment, since each of the storage drives 20 configuring the same RAID group 51 are provided with power supply paths so as to receive drive power from the respective AC-DC 22 power supplies through the different power supply paths (so that the power supply boundaries 52 to which the respective storage drives belong would be different), effects on the storage drive 20 (such as loss of data, or performance deterioration) caused when a failure occurs in the AC-DC power supply 22 or the storage drive 20 can be held in small area.

While the embodiments of the present invention have been described above, the embodiments are intended to facilitate the understanding of the present invention and not to limit the scope thereof. The present invention may be altered and modified without departing from the spirit of the invention, and also includes equivalents thereof.

For example, the foregoing description was given of the case where the load receiving power supply from the AC-DC power supply 22 was the storage drive 20. However, the load may be other components of the storage apparatus 10 or peripherals thereof.

The invention claimed is:

1. A storage apparatus that writes data to a storage drive or reads data from a storage drive in response to an I/O request sent from an external device, the storage apparatus comprising:
   a plurality of power supply devices that supplies the storage drive with drive power; and
   a plurality of gate units to stop supplying drive power to the storage drives,
   wherein each of the gate units include:
   a first voltage abnormality detection circuit that detects a voltage abnormality in power supplied from the power supply device;
   a voltage conversion circuit that converts a first voltage supplied from the power supply device to a second voltage for supplying the storage drives with drive power of the second voltage;
   a second voltage abnormality detection circuit that detects a voltage abnormality supplied from the voltage conversion circuit;
   a second back-flow prevention circuit, which is coupled between the second voltage abnormality detection circuit and storage devices, that prevents a back-flow of a current; and
   a gate circuit, which is coupled between the first voltage abnormality detection circuit and the voltage conversion circuit, that stops supplying the first voltage to the storage drive when the first voltage abnormality detection circuit or second voltage abnormality detection circuit detects the voltage abnormality.

2. The storage apparatus according to claim 1, wherein
   the storage apparatus writes data to each of a plurality of storage drives or reads data from each of a plurality of storage drives,
   the storage drives configure a RAID group, and
   each of the storage drives belonging to the same RAID receives supply of drive power through a different gate unit, respectively.

3. The storage apparatus according to claim 1, wherein
   the gate units are configured to supply the storage drives with drive power of the first voltage, and
   wherein the gate units also include a first back-flow prevention circuit, which is coupled between the gate circuit and the storage devices, that prevents a back-flow of a current.

4. The storage apparatus according to claim 1, wherein the gate circuit is configured with an integrated circuit used to configure a circuit that suppresses an abnormal current generated when the gate unit is hot-swapped.

5. The storage apparatus according to claim 1, comprising an information apparatus communicatively coupled to each of the gate units, wherein
   the information apparatus determines which one of the power supply devices, the gate units, and the voltage conversion circuits has a failure, based on at least one of
   a voltage supplied from any one of the power supply devices,
   an output voltage of any one of the voltage conversion circuits, whether or not the first voltage abnormality detection circuit detects an abnormal voltage in the first voltage, and
   whether or not the second voltage abnormality detection circuit acquired from the respective gate units.

6. The storage apparatus according to claim 5, wherein the information apparatus includes a display that outputs a result of the determination.

7. The storage apparatus according to claim 2 including an information apparatus, wherein
   each of the storage drives is mounted on a mounting portion provided to an accommodation chassis,
   the information apparatus
   stores the gate units assigned to the respective mounting portions,
   stores a method of assigning to the mounting portions for each configuration of a RAID group,
   receives a configuration of a RAID group to be set,
   acquires the method of assignment corresponding to the received configuration, and
   assigns, as a component of the RAID group, the storage drives to the mounting portions according to the acquired method of assignment.

8. The storage apparatus according to claim 1, wherein the power supply devices are accommodated in a first chassis, and the gate units are accommodated in a second chassis different from the first chassis.

9. The storage apparatus according to claim 1 further comprising:

a communication control circuit that communicates with a source or the I/O request;

a drive control circuit that communicates with the storage drive;

a memory circuit that provides a cache memory in which data to be written to the storage drive or data read from the storage drive is temporarily stored; and a processor circuit that performs data transfer among the communication control circuit, the drive control circuit, and the memory circuit.

10. A storage apparatus comprising:

a plurality of storage devices for storing data;

a plurality of power supply devices that supplies that storage device with drive power; and a plurality of gate units to stop supplying drive power to the storage drives, wherein each of the gate units include:

a first voltage abnormality detection circuit that detects a voltage abnormality in power supplied from the power supply device;

a voltage conversion circuit that converts a first voltage supplied from the power supply device to a second voltage for supplying the storage drives with drive power of the second voltage;

a second voltage abnormality detection circuit that detects a voltage abnormality supplied from the voltage conversion circuit;

a second back-flow prevention circuit, which is coupled between the second voltage abnormality detection circuit and the storage devices, that prevents a back-flow of a current; and a gate circuit, which is coupled between the first voltage abnormality detection circuit and the voltage conversion circuit, that stops supplying the first voltage to the storage drive when the first voltage abnormality detection circuit or second voltage abnormality detection circuit detects the voltage abnormality.

* * * * *